Aug. 8, 1944.   J. W. BRYCE   2,355,268
PHOTOGRAPHIC RECORDING MACHINE
Filed April 24, 1942   22 Sheets-Sheet 1

James W. Bryce
INVENTOR
BY
John C. Kerr
ATTORNEY

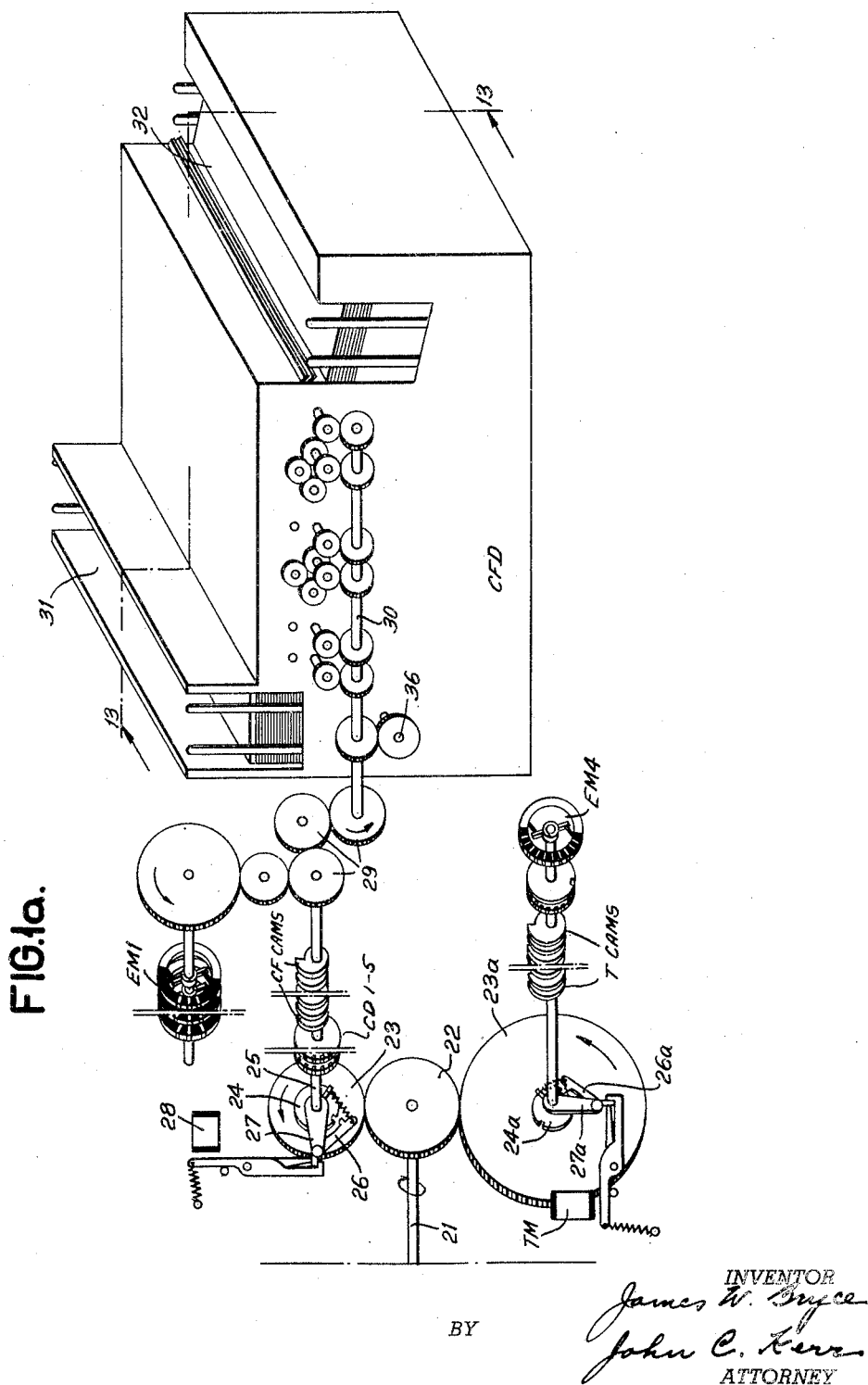

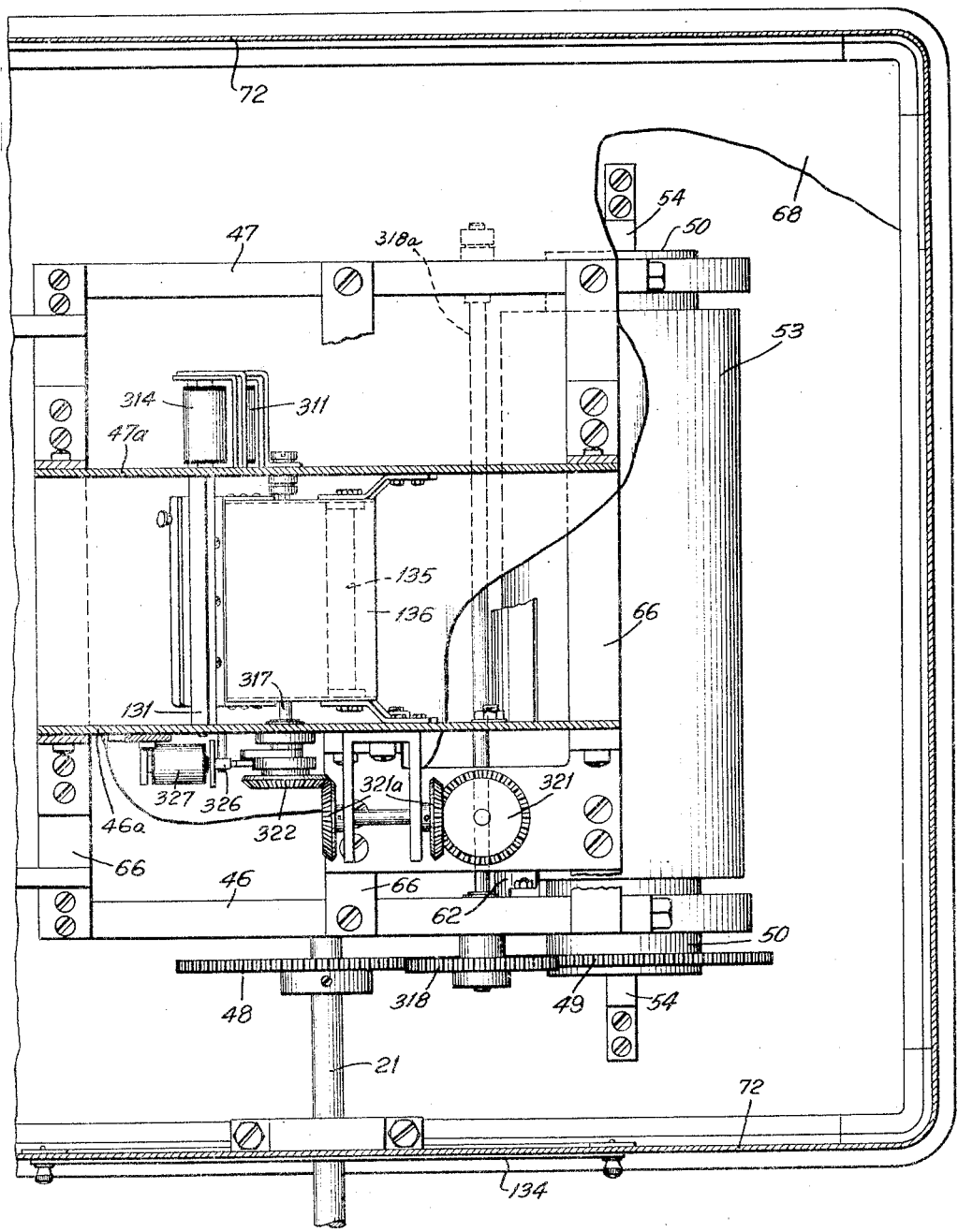

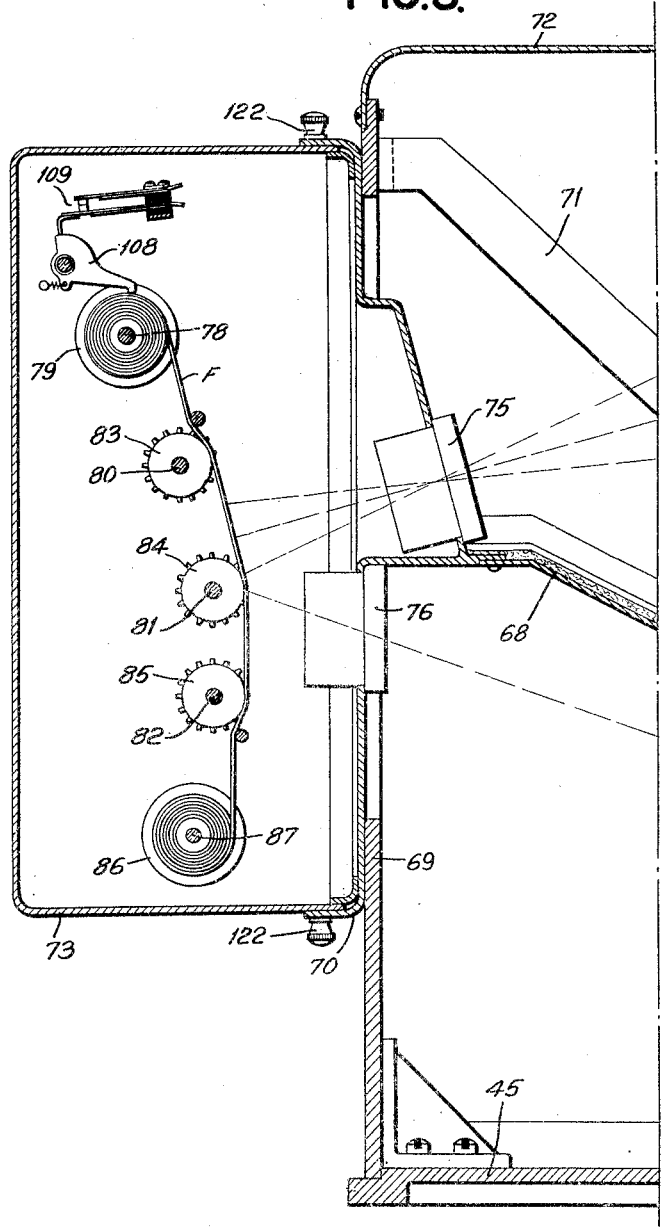

Aug. 8, 1944.   J. W. BRYCE   2,355,268
PHOTOGRAPHIC RECORDING MACHINE
Filed April 24, 1942   22 Sheets-Sheet 5

James W. Bryce
INVENTOR
BY John C. Kerr
ATTORNEY

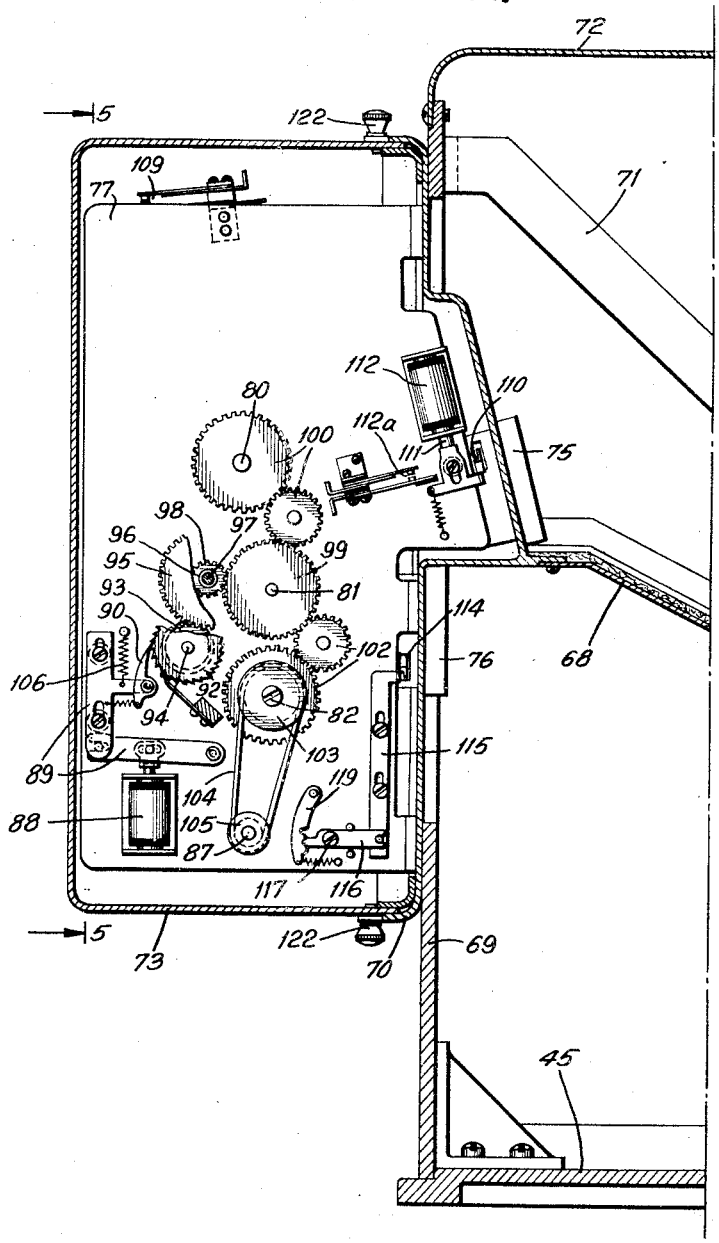

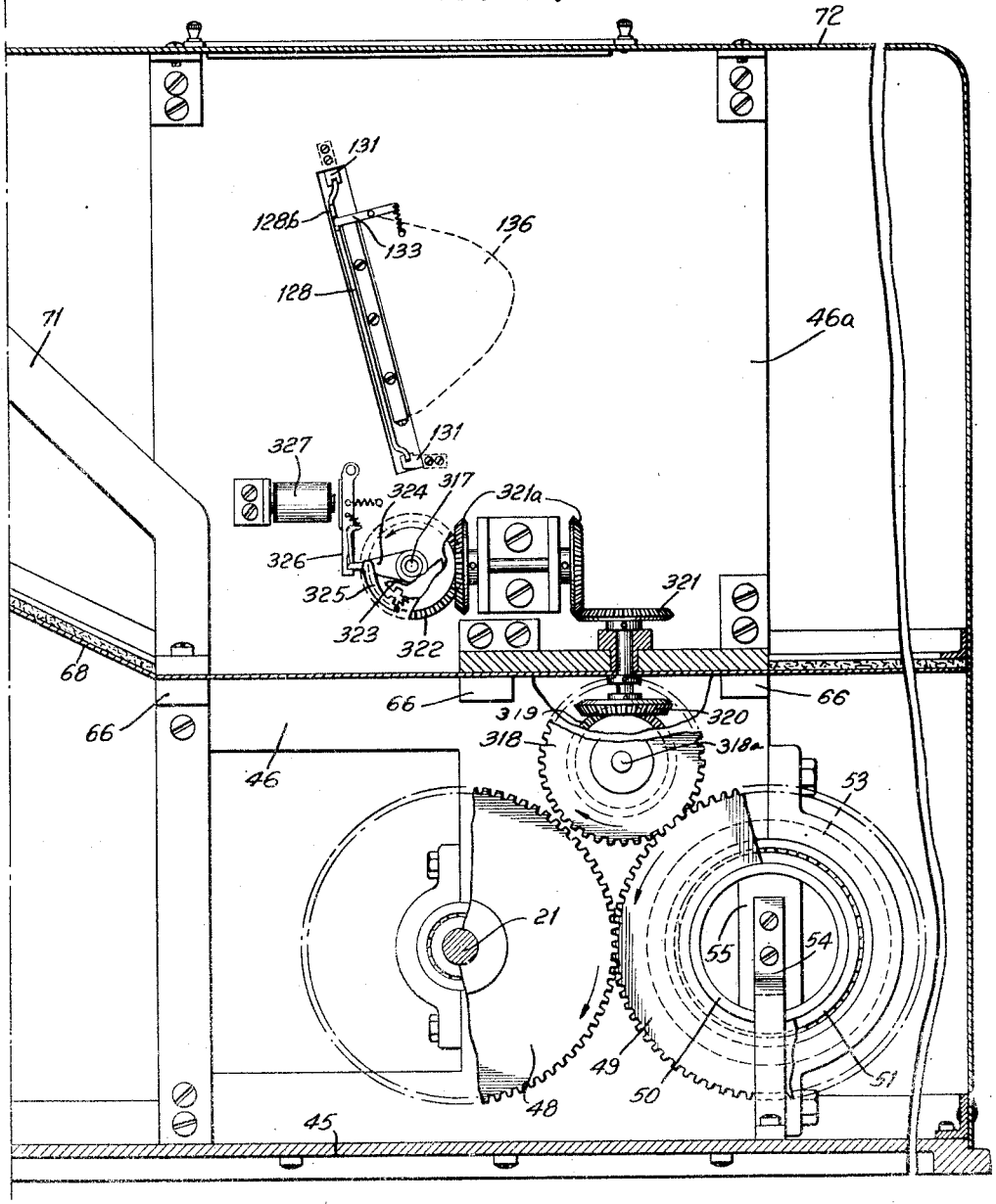

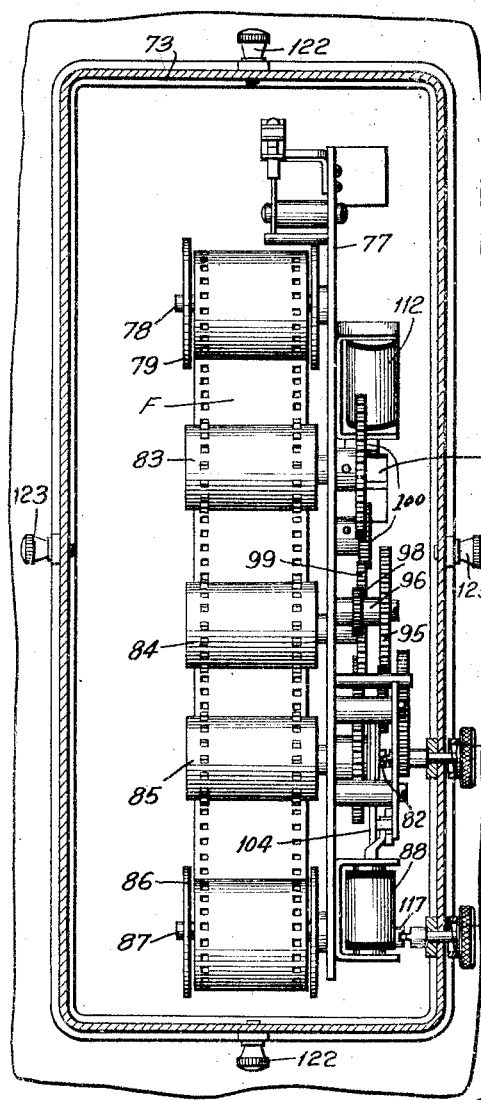
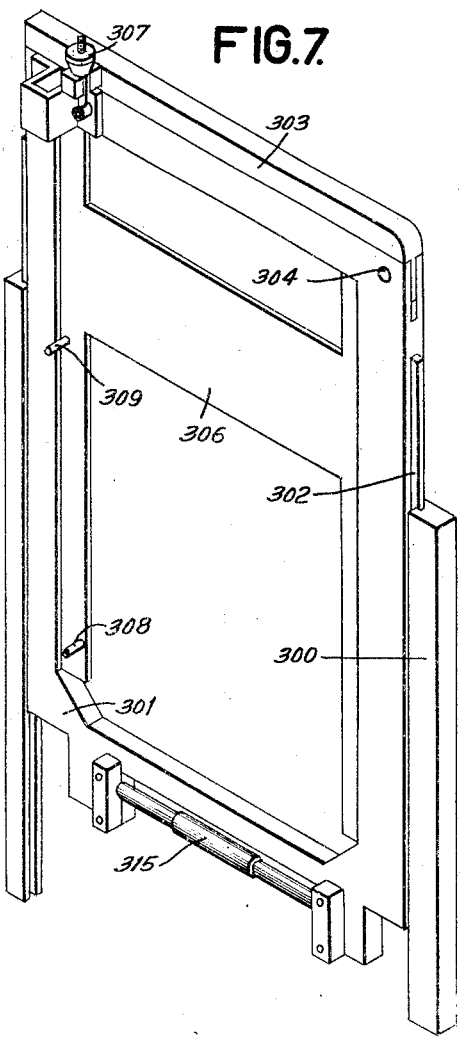
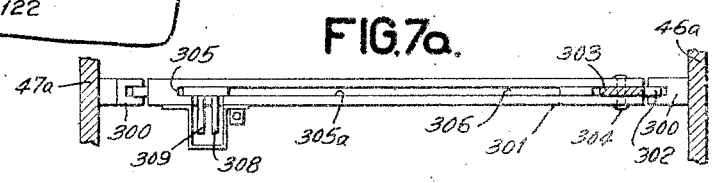
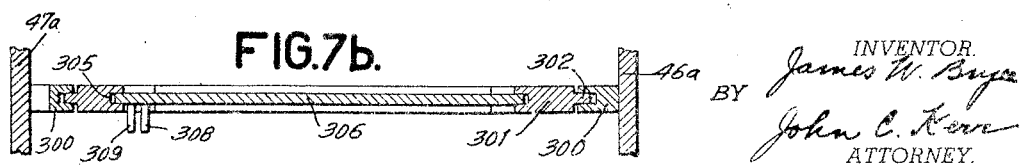

Aug. 8, 1944.   J. W. BRYCE   2,355,268
PHOTOGRAPHIC RECORDING MACHINE
Filed April 24, 1942   22 Sheets-Sheet 10
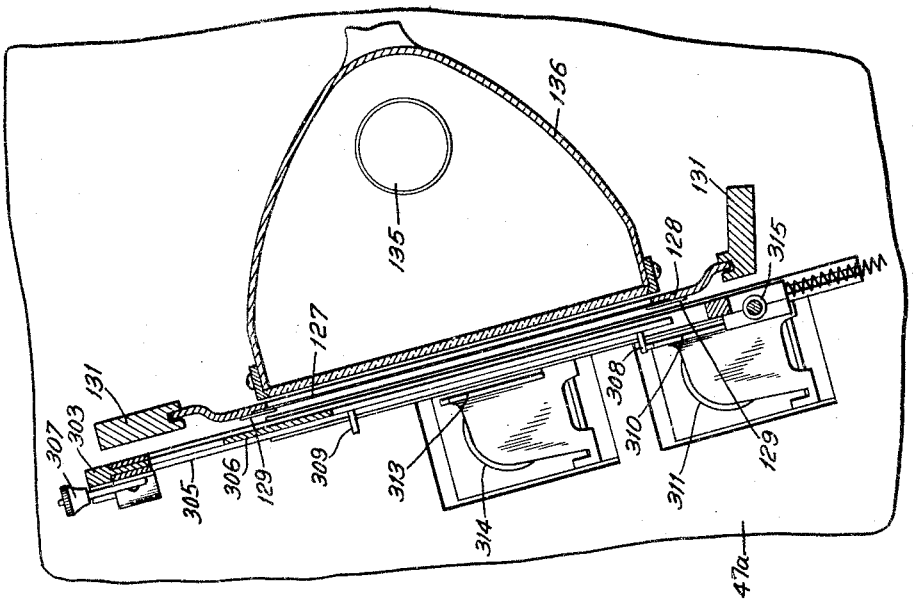
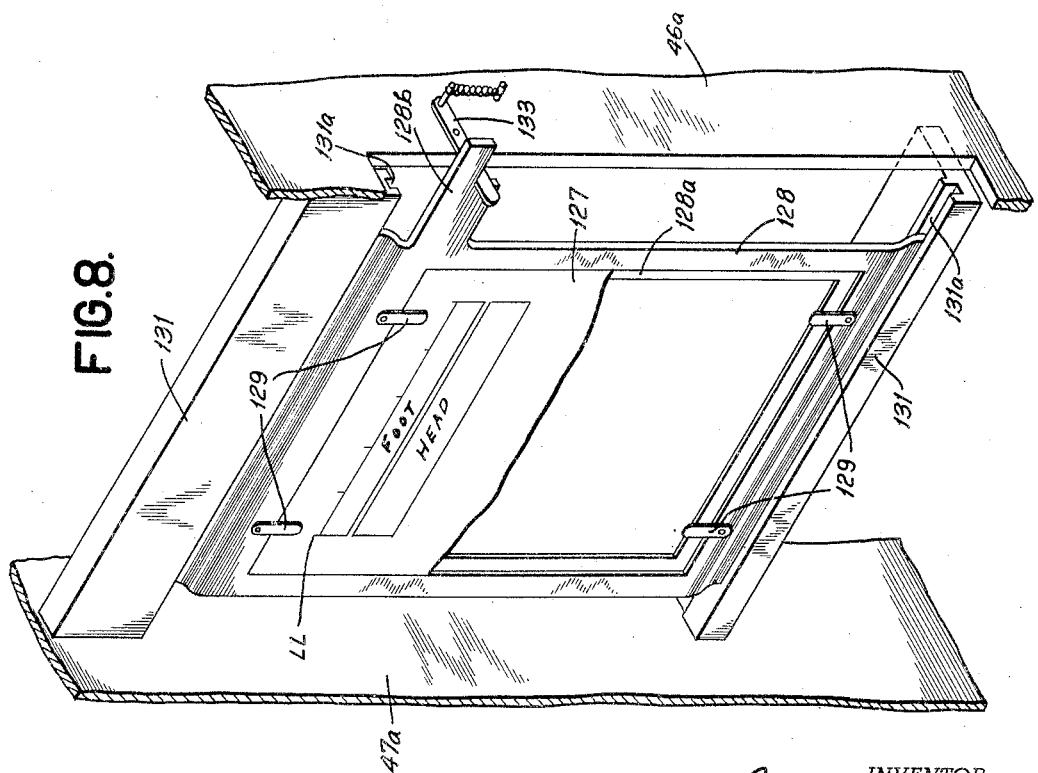
INVENTOR.
James W. Bryce
John C. Kerr
BY   ATTORNEY.

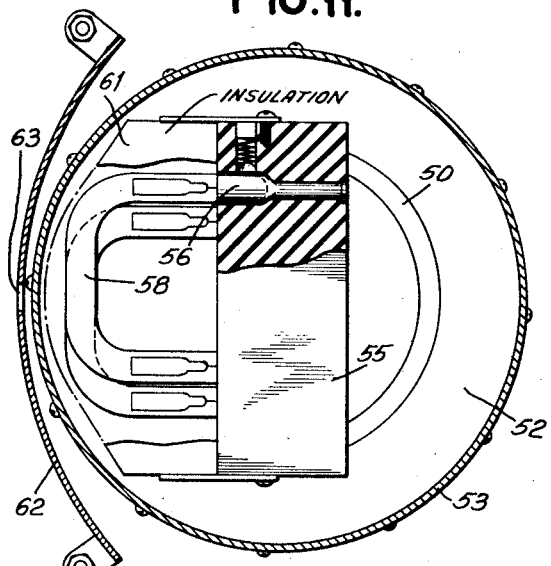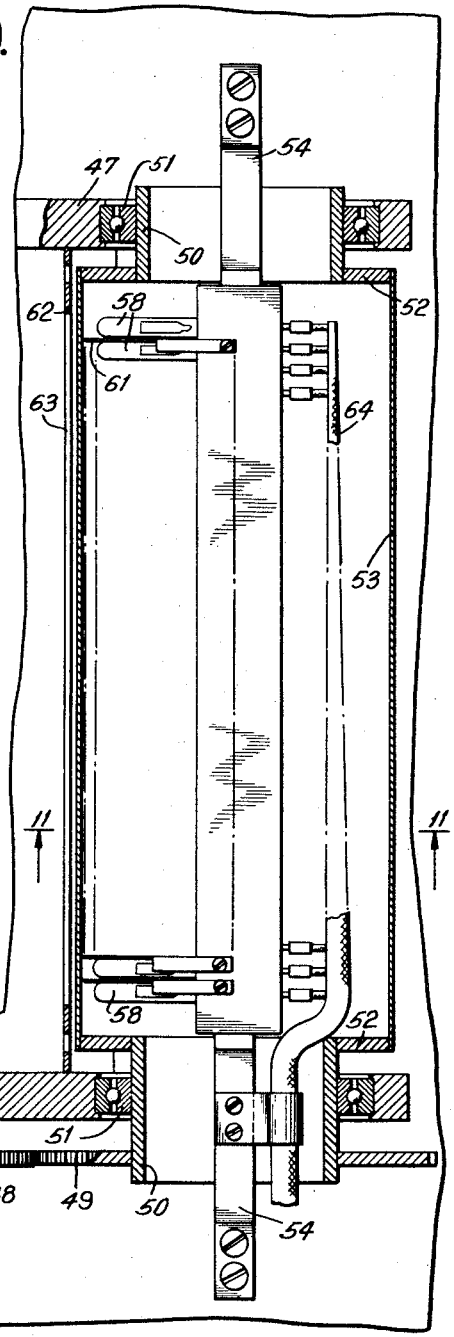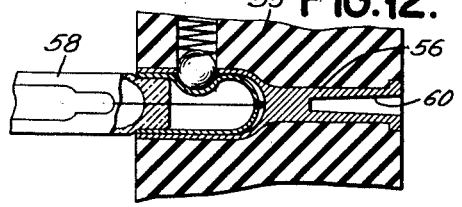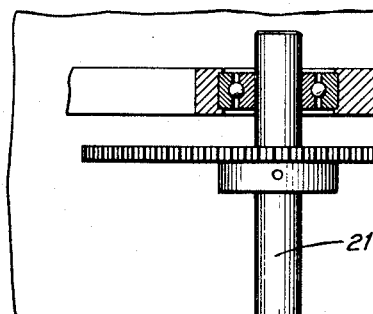

Aug. 8, 1944.    J. W. BRYCE    2,355,268
PHOTOGRAPHIC RECORDING MACHINE
Filed April 24, 1942    22 Sheets-Sheet 12
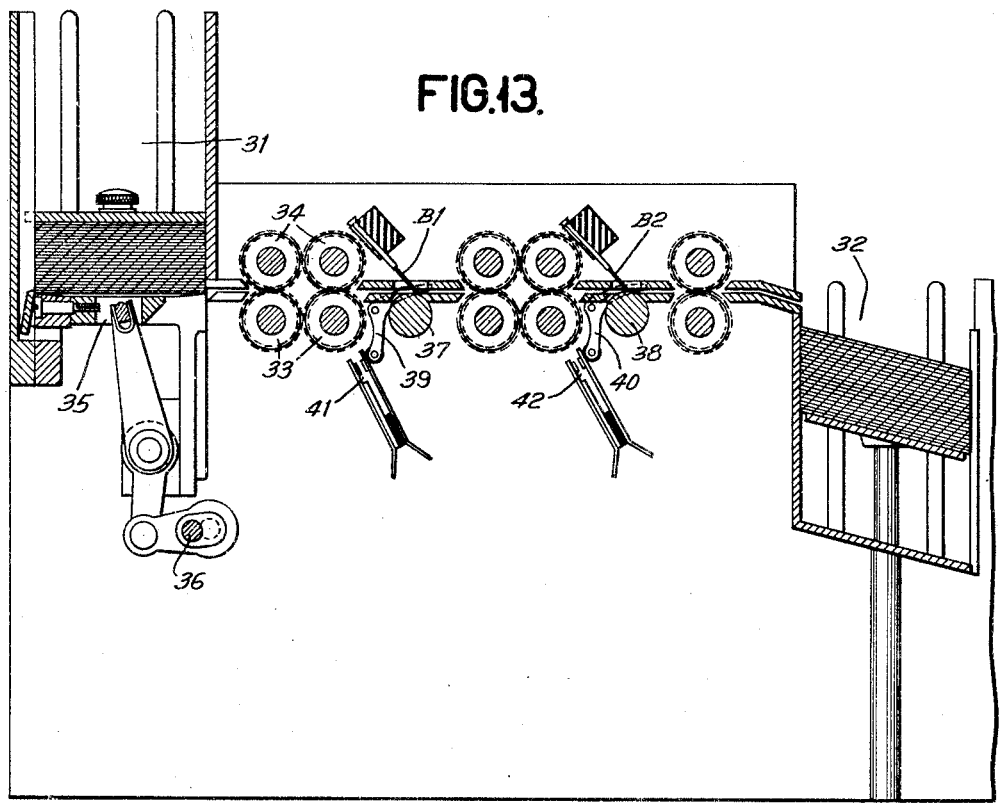
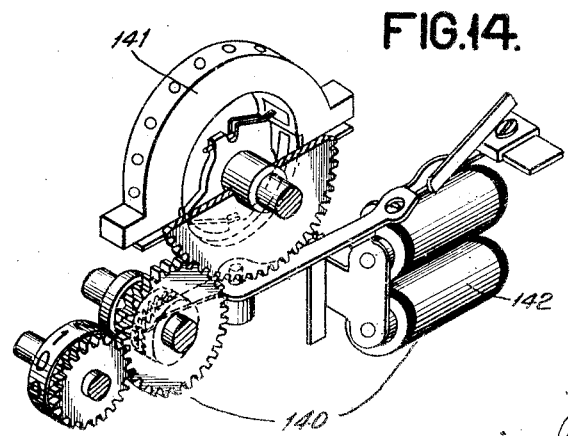
James W. Bryce
INVENTOR
BY John C. Kerr
ATTORNEY Aug. 8, 1944.  J. W. BRYCE  2,355,268
PHOTOGRAPHIC RECORDING MACHINE
Filed April 24, 1942    22 Sheets-Sheet 13
FIG. 16.
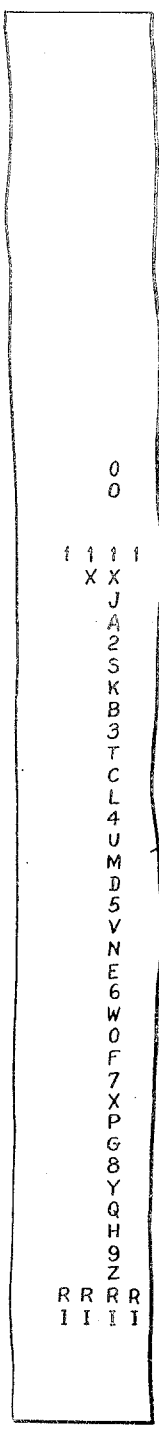
FIG. 18.
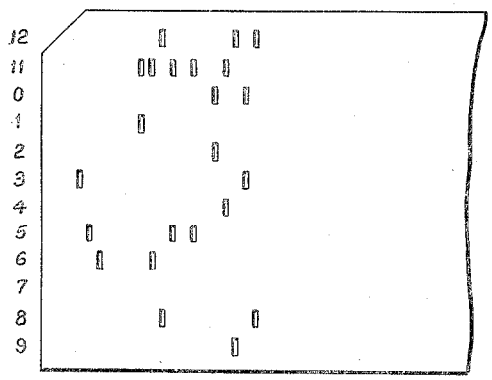
FIG. 17.
| ZONE VALUE | DIGIT OR INTRAZONE STEPS | | | | | | | | | |
|---|---|---|---|---|---|---|---|---|---|---|
|  | 0 | 1 | 2 | 3 | 4 | 5 | 6 | 7 | 8 | 9 |
| 12 |  | A | B | C | D | E | F | G | H | I |
| 11 |  | J | K | L | M | N | O | P | Q | R |
| 0 | 0 |  | S | T | U | V | W | X | Y | Z |
| NONE |  | 1 | 2 | 3 | 4 | 5 | 6 | 7 | 8 | 9 |
FIG. 15.
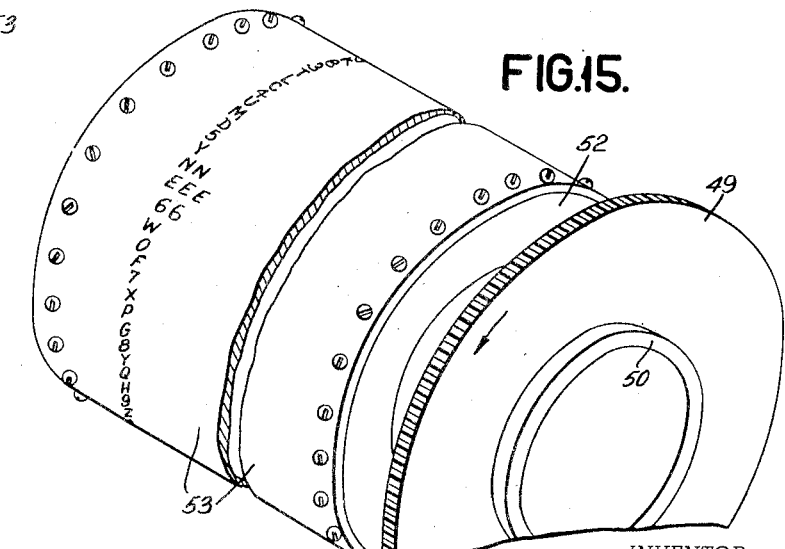
INVENTOR
James W. Bryce
BY John C. Kerr
ATTORNEY

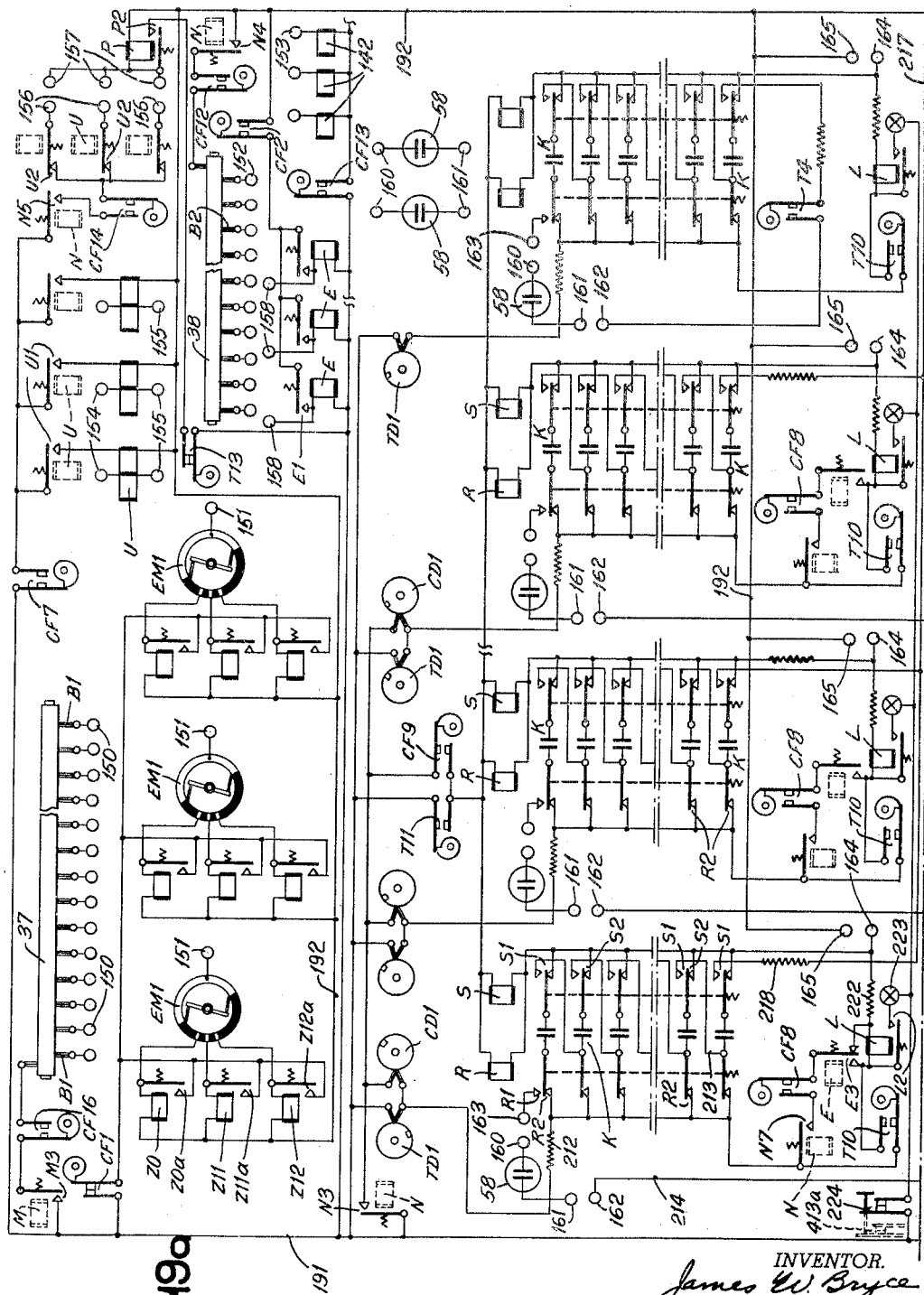

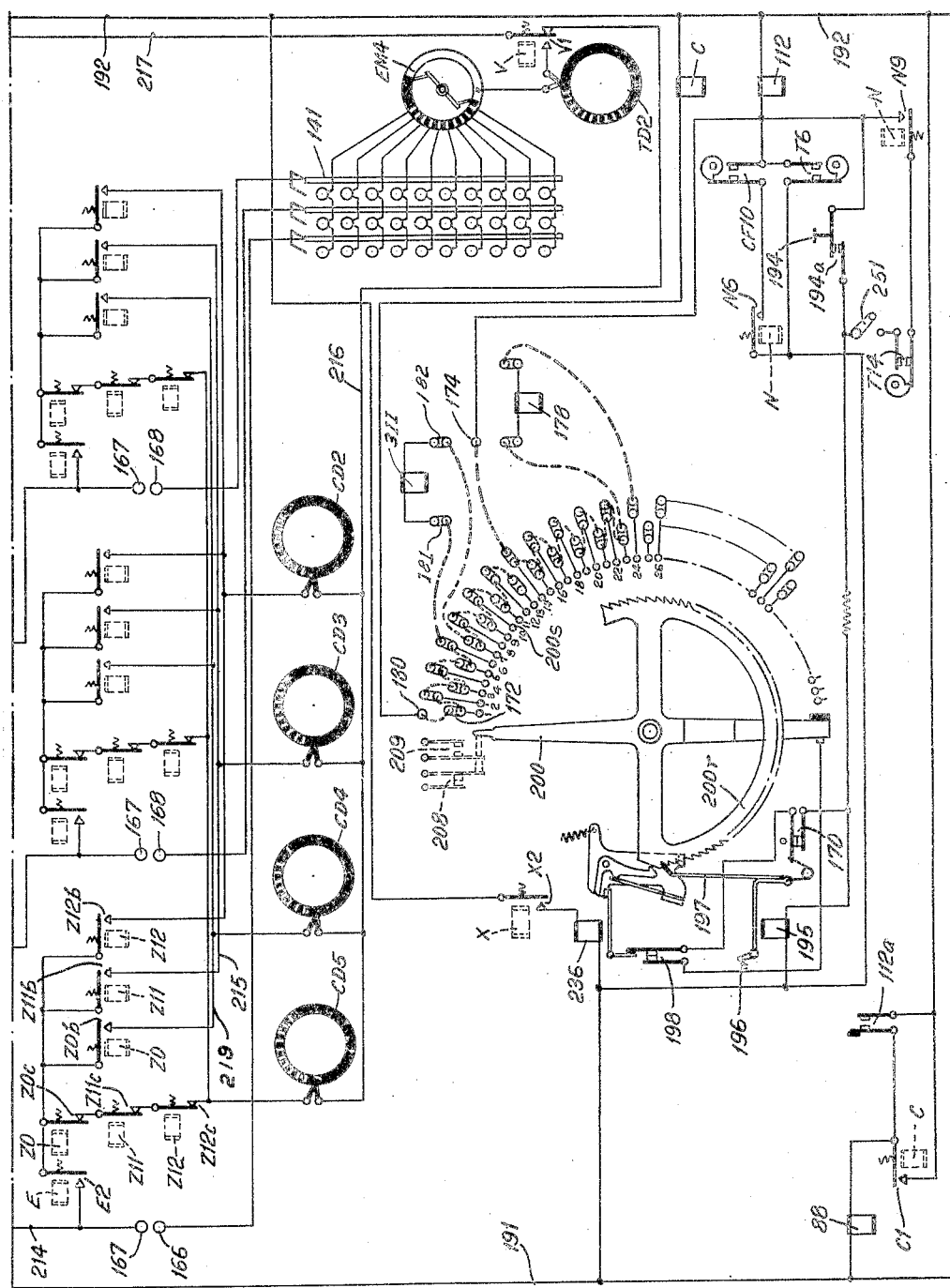

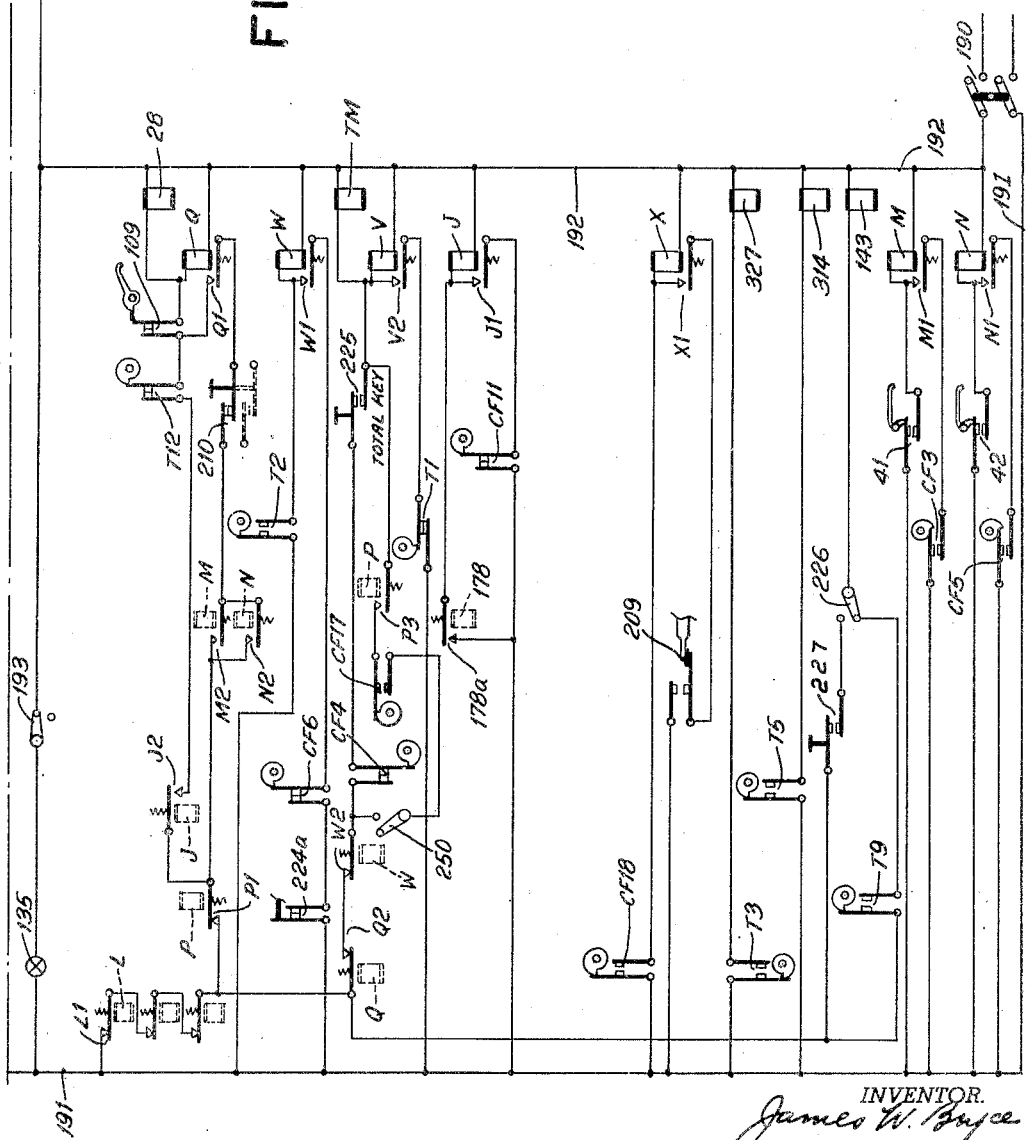

Aug. 8, 1944.                J. W. BRYCE                2,355,268
                    PHOTOGRAPHIC RECORDING MACHINE
                    Filed April 24, 1942      22 Sheets-Sheet 18
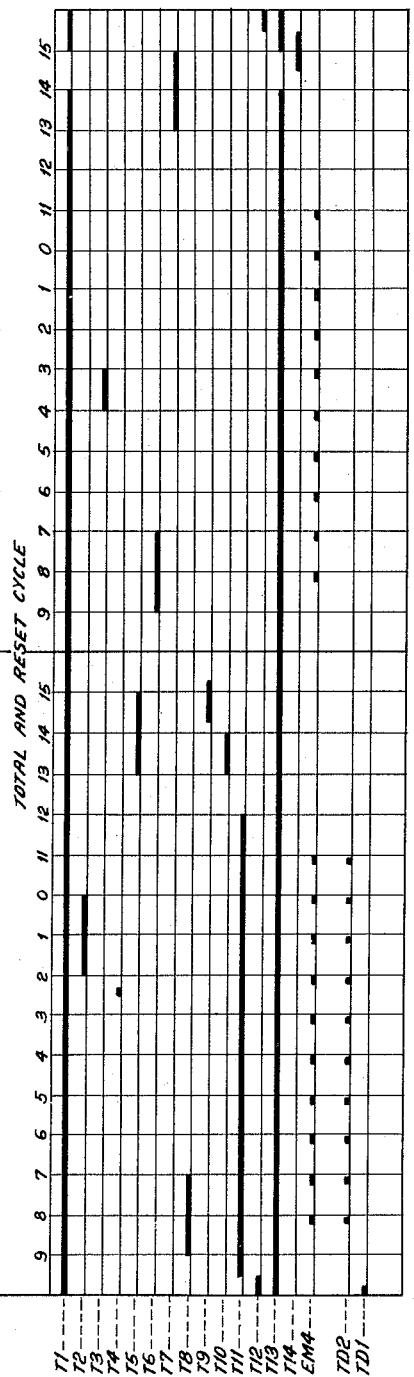
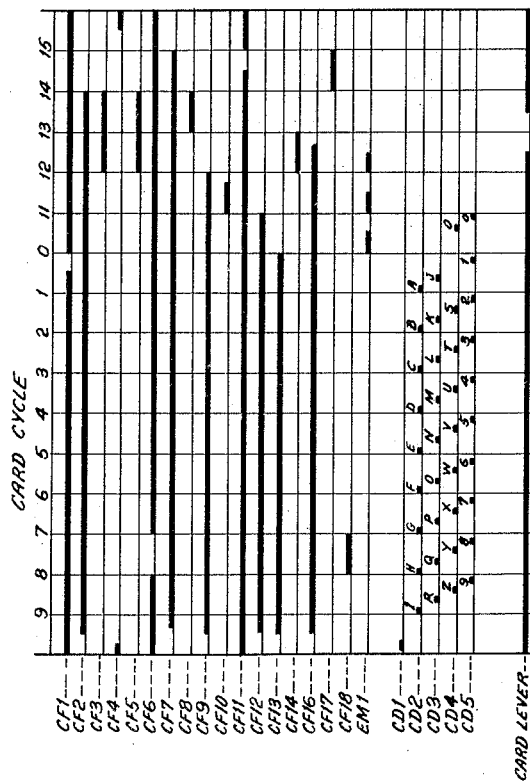
FIG.21.
INVENTOR.
James W. Bryce
BY John C. Kerr
ATTORNEY.

Aug. 8, 1944.  J. W. BRYCE  2,355,268
PHOTOGRAPHIC RECORDING MACHINE
Filed April 24, 1942  22 Sheets-Sheet 20

James W. Bryce
INVENTOR.

BY John C. Kerr
ATTORNEY.

Aug. 8, 1944.     J. W. BRYCE     2,355,268
PHOTOGRAPHIC RECORDING MACHINE
Filed April 24, 1942     22 Sheets-Sheet 21
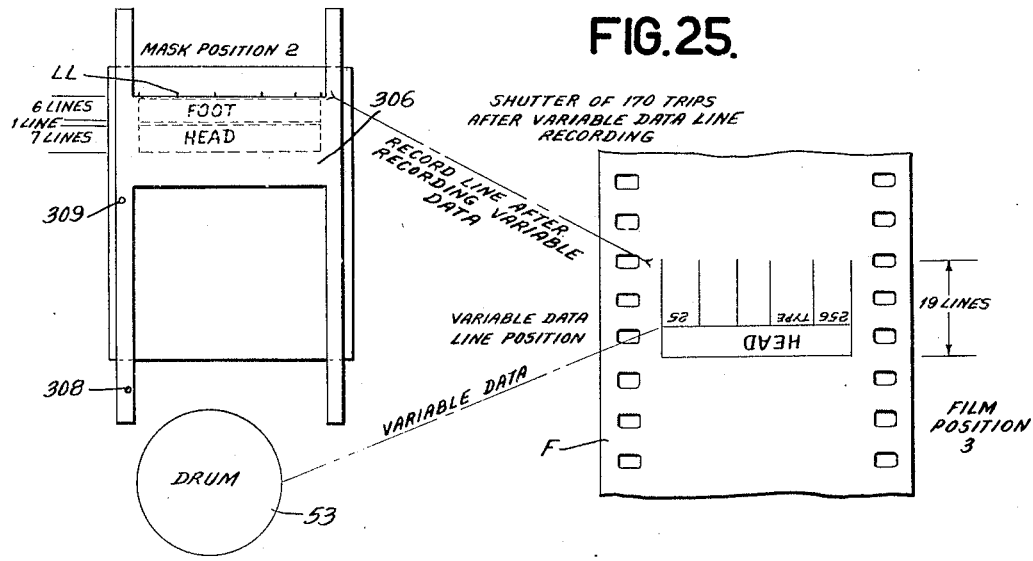
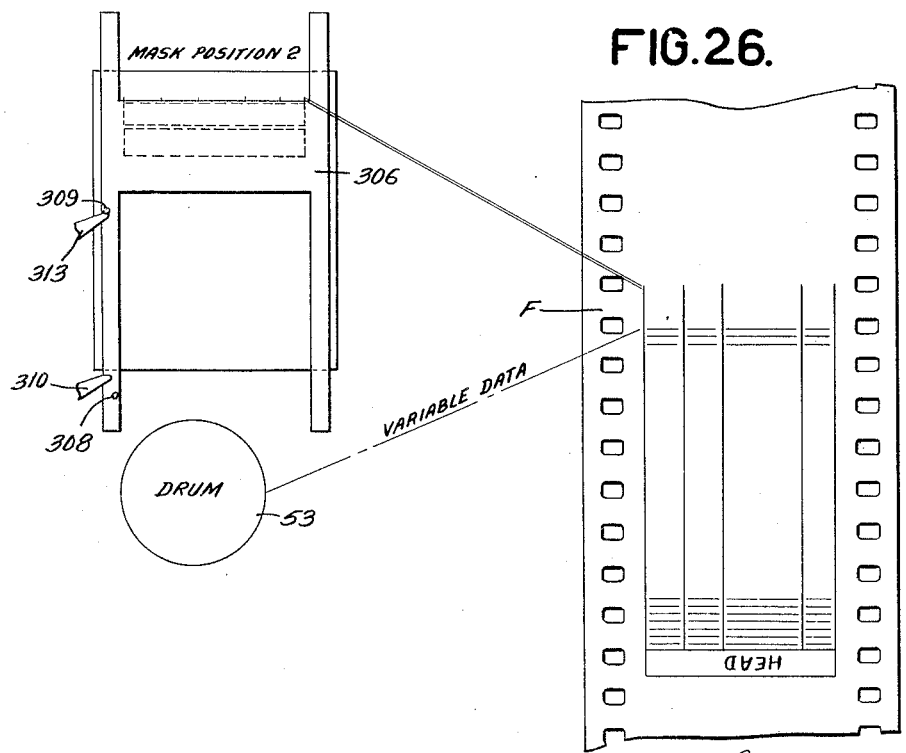

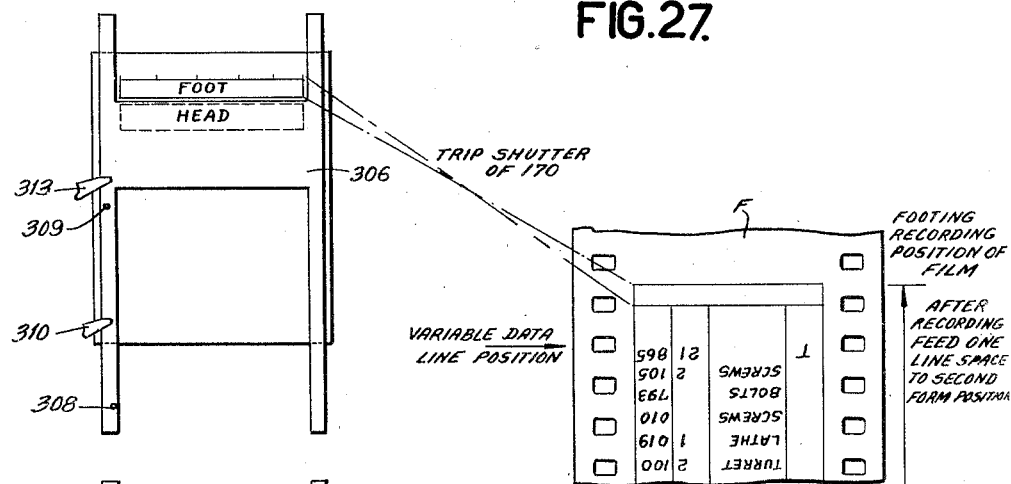
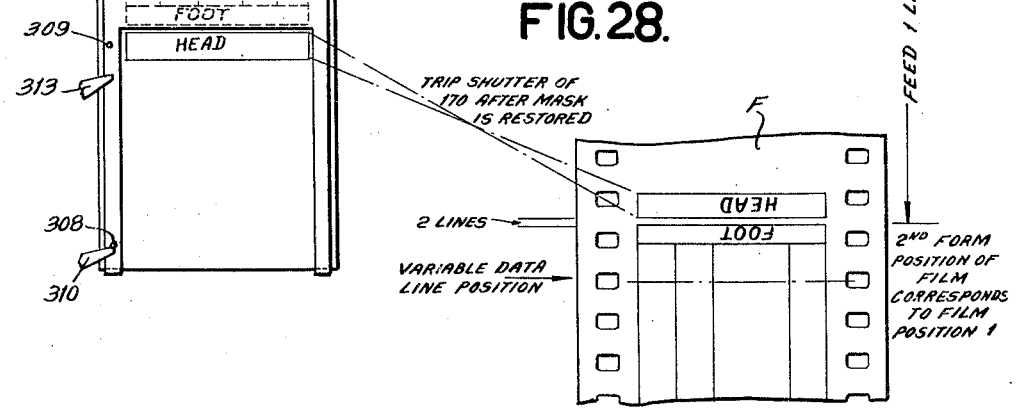

Patented Aug. 8, 1944

2,355,268

UNITED STATES PATENT OFFICE 2,355,268

PHOTOGRAPHIC RECORDING MACHINE

James W. Bryce, Glen Ridge, N. J., assignor to International Business Machines Corporation, New York, N. Y., a corporation of New York Application April 24, 1942, Serial No. 440,287

20 Claims. (Cl. 88—24)

This invention relates to improvements in recording apparatus for accounting machines. More particularly, the present invention relates to improvements in the machines shown in my copending applications, Serial Nos. 426,550, filed Jan. 13, 1942; 430,597, filed February 12, 1942; and 437,249, filed April 1, 1942. In the machine shown in said former application, Serial No. 437,-249, provision was made for recording variable data upon successive lines upon a film and provision was also made for exposing form data which was related to the variable data. The form data, as there disclosed, may consist of a heading, footing and intermediate column or vertical field-defining lines. The particular indicia in the heading and footing and the arrangement of the indicia and of the intermediate field defining lines depend on the kind of accounting record which is to be made. For example, it may be desired to record the salary lists of employees in different departments of a concern. The heading for each list may comprise data identifying the concern and the kind of record being made, the footing may comprise certain pertinent terminal data, and the intermediate lines may provide a suitable list arrangement for the variable data. The variable data will comprise successive items pertaining to the different individuals in each department or group. The number of employees in the different groups may vary considerably, and therefore, the number of variable lines of data to be recorded on a form may correspondingly vary. Nevertheless, the same form data must be used for each group or department. The length of the form derived from a form pattern must accommodate the maximum number of variable data lines pertaining to a group to be recorded within a form. Thus, the maximum form length was determined by the maximum number of lines of variable data in a group which was to be recorded on one form. Such maximum form length also had to be used when the number of variable data lines in a group was considerably less. Alternatively, the form pattern could be changed, such pattern to comprise the same indicia, but to differ in length. However, this would require the operator to preliminarily ascertain different numbers of variable data lines which were to be recorded for different groups and would require the machine to be stopped often and the form pattern to be changed frequently.

The form data which was exposed in my prior machine, shown in Serial No. 437,249, was of chosen predetermined length regardless of the number of lines of variable data to be recorded on a given form. If a form of a different length was required, the form pattern had to be changed by the operator.

In accordance with accounting practice and as explained above, the number of lines of variable data may vary considerably. For example, one group of variable data may comprise say fifteen lines, the next group may comprise twenty-five lines and the following group sixty lines and so on. With my previous machine if such data was to be recorded successively upon a strip of continuous film, the operator would have to select a form pattern for the longest length of form and use such form pattern for the variable data recordings which required less form length. Or in the alternative, the operator would have to change the form pattern each time the number of lines of variable data in a group varied.

According to the present invention, means are provided to record form data of variable length determined by the number of items to be recorded in relation to the form.

Further, the present invention has for an object the provision of means for deriving form records of varying length from elements of a single form pattern.

Another object is to provide means for exposing different elements of a form pattern successively and in conjunction therewith to expose variable data in relation to the form data.

The present invention has also for its general objects the provision of an improved machine wherein fixed form material such as the footing and heading may be exposed and recorded on the film and wherein provision is also made for recording supplemental form material such as columnar separating lines on the film in a manner to provide for variable overall length of such lines on successively recorded complete forms. In this way the overall length of the successively recorded complete forms may vary from form to form and such variation may be secured without the necessity of changing the form patterns when forms of different overall lengths are to be successively recorded.

A further object of the present invention resides in the provision of a machine adapted to record first a form heading on a film, then to record the required number of lines of variable data, while successively for each line of variable data recording an increment of the separating column lines and for thereafter recording the footing for the form.

A further object of the present invention resides in the provision of a machine in which all of the objects set forth in the preceding paragraph may be effected automatically without manual intervention by the operator.

A further object of the present invention resides in the provision of a machine adapted to record both variable data and form data upon a film and to provide means whereby the recording of a portion of the form such as the columnar separating line portion thereof may be made dependent upon and automatically correlated with the number of lines of variable data which are to be recorded on a particular form.

A further object of the present invention resides in the provision of recording apparatus for an accounting machine wherein the length of form data which is recorded is automatically determined by record controlled means such as for example group control means.

A further object of the present invention resides in the provision of recording apparatus for an accounting machine wherein the length of form data which is recorded is automatically determined by total taking control means.

Further and other objects of the present invention will be hereinafter set forth in the accompanying specification and claims and shown in the drawings which show by way of illustration a preferred embodiment and the principle thereof and what I now consider to be the best mode in which I have contemplated applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together, with Fig. 1a to the right of Fig. 1, shows a perspective view of the improved machine;

Fig. 2 is a top plan and part sectional view of a portion of the recording unit but with the cover removed. The view is taken substantially on the plane 2—2 of Fig. 1;

Figs. 3 and 3a, taken together with Fig. 3a to the right of Fig. 3, show a sectional view of the recording unit. The section is taken substantially on line 3—3a—3—3a of Fig. 1;

Figs. 4 and 4a, taken together with Fig. 4a to the right of Fig. 4, show another sectional view of the recording unit taken on a different plane, i. e. on plane 4—4a—4—4a of Fig. 1;

Fig. 5 is a sectional view of the camera unit, the section being taken on line 5—5 of Fig. 4;

Fig. 6 is a front elevational view of the form carrier unit, the view being taken substantially on line 6—6 of Fig. 3a;

Fig. 7 is a perspective view of the shiftable mask and the carrier therefor;

Fig. 7a is a sectional view of the mask and mask holder or frame taken on line 7a—7a of Fig. 6;

Fig. 7b is another sectional view of the same parts taken on line 7b—7b of Fig. 6;

Fig. 8 is a perspective view of the form carrier which is used in the recording mechanism;

Fig. 9 is a view showing portions of the mechanism shown in the upper part of Fig. 3a, but drawn on a somewhat larger scale for clarity of illustration;

Fig. 10 is a detail sectional view showing the pattern carrying drum and the driving train therefor. The section is taken substantially on line 10—10 of Fig. 3a. The view is drawn on a larger scale.

Figure 20:
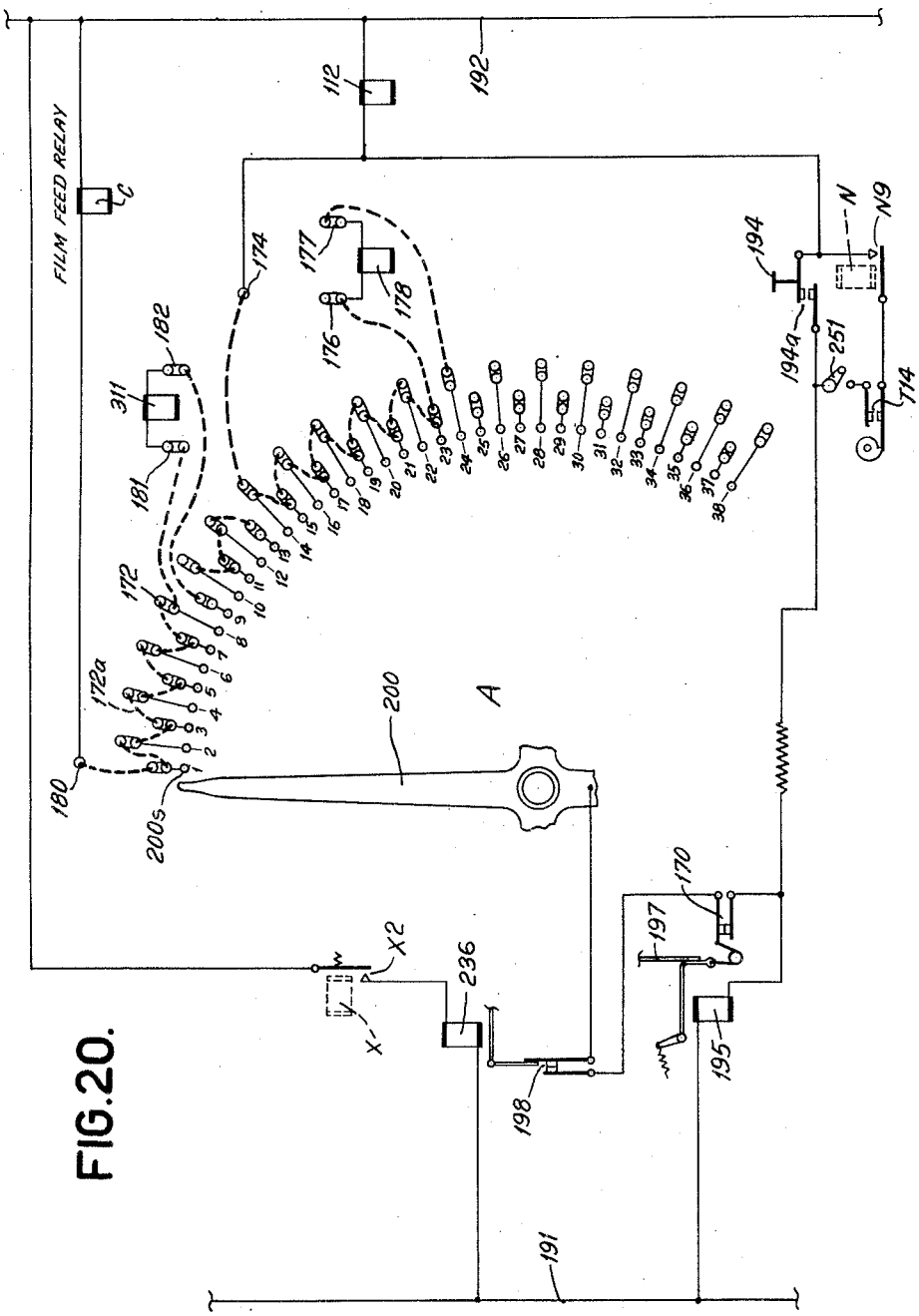
Figure 22:
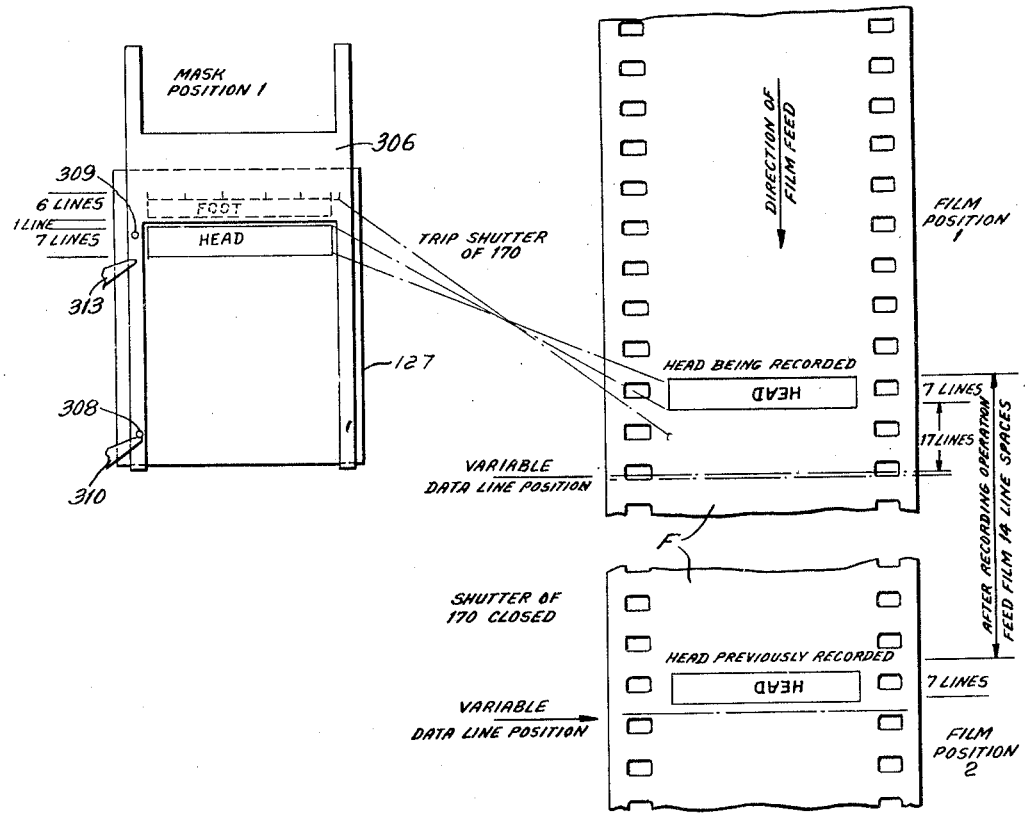

Fig. 11 is a detail sectional view taken on line 11—11 of Fig. 10 and shows the neon tube within the drum and the mounting therefor;

Fig. 12 is a detail view of the tube mounting shown on a somewhat larger scale than in Fig. 11;

Fig. 13 is a detail sectional view of the card feeding section of the machine. This section is taken substantially on line 13—13 of Fig. 1a;

Fig. 14 is a perspective view showing certain elements of the accumulator together with the readout device associated therewith;

Fig. 15 is a perspective view of the character carrying drum;

Fig. 16 shows a development of the drum for one complete column of characters;

Fig. 17 shows a code table denoting the manner of manifesting the different numerical and alphabetical characters by combinations of index point designations;

Fig. 18 is a fragmentary view of a typical tabulating card with certain index points perforated to indicate numerical characters and others perforated to denote alphabetical characters;

Figs. 19a, 19b and 19c, taken together and arranged vertically in the order named, show the circuit diagram of the machine;

Fig. 20 is an enlarged view of a portion of the circuit diagram showing the manner of plugging up the machine and particularly the manner of plugging up the stepping switch circuits;

Fig. 21 shows a timing diagram;

Fig. 22 is a diagrammatic view showing the relation of the form data pattern, with the mask in 1st position, to the film section in positions 1 and 2 and indicating the manner of recording of a heading on the film section in position 1 and the extent of feed of the film in advancing from position 1 to position 2.

Figure 23:
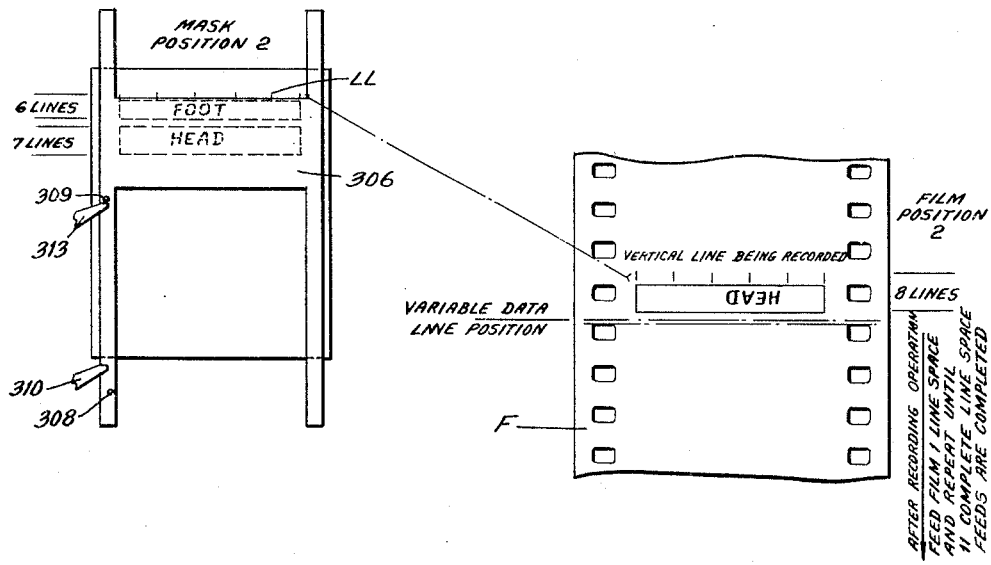

Fig. 23 is a diagrammatic view showing the mask in a second position and indicating the manner of recording the first increment of ruling lines on the film section in position 2.

Figure 24:
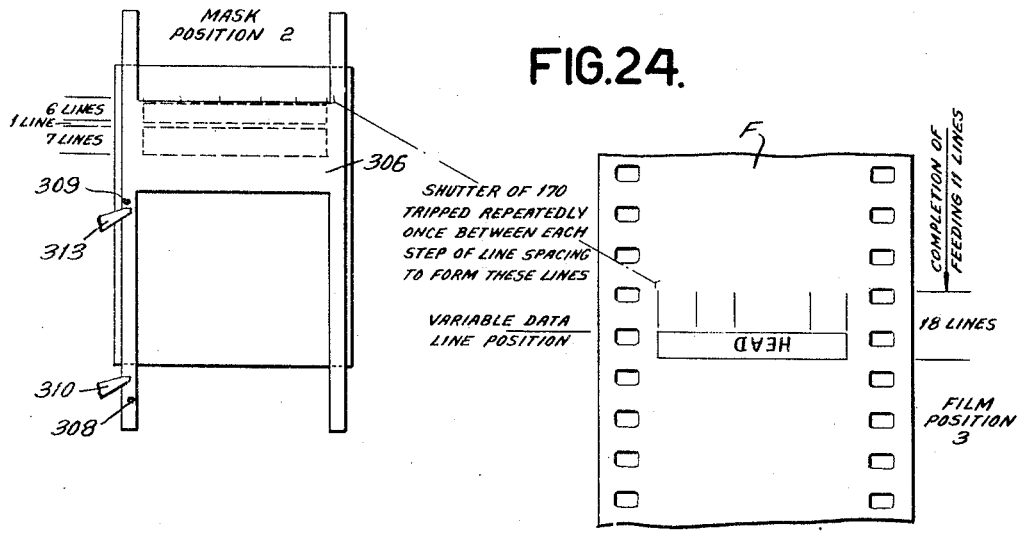

Fig. 24 is a diagrammatic view with the film section in position 3 after recording of a predetermined number of successive increments of ruling lines.

Fig. 25 diagramatically shows the relation of the film section in position 3 to the form pattern, the mask therefor, and to the character bearing drum during the recording of the first line of variable character data.

Fig. 26 is a similar view after a plurality of lines of variable character data have been recorded on the film section.

Fig. 27 diagrammatically shows the relation of the film section to the form pattern, with the mask in position 3, during the recording of the foot of the form.

Fig. 28 diagramatically shows the relation of the form pattern, with the mask back in position 1, during the recording of a heading on the next film section.

GENERAL DESCRIPTION

In general, the machine comprises a record handling section, an accounting section and a recording section. In the record handling section, provision is made for handling records one by one and advancing them from a supply magazine to a discharge magazine. Enroute, the records pass the usual sensing brushes. These comprise advance sensing brushes for sensing zoning designations on the records and regular sensing brushes for sensing the intra-zone or numerical designations on the records. The accounting section includes an accumulator wherein amounts read from the record are accumulated. The recording section may be considered to have two parts. One of these parts is a section for recording variable data. In this section there is a constantly rotating character carrying drum. This drum is adapted to be trans-illuminated by neon tubes. The neon tubes are selectively fired under the control of record controlled means which are in turn under the control of the sensing brushes, including both the regular brushes and the advance sensing brushes. In this way data corresponding to each record is selectively trans-illuminated on the character carrying drum and this trans-illuminated data is exposed on a film. In addition to photographing variable data derived from the records, provision is also made in this section of the machine for photographing data derived from the accounting section of the machine, such as a total. Such total data is recorded on the film.

Another part of the recording section comprises a form recording section. In brief, this form recording section comprises a form transparency and means for photographing form data derived therefrom on the film. The form transparency is replaceable in a form transparency holder or slide. By removing one form transparency and replacing it with another different form matter can be photographed on the film. According to the present invention, form matter which is photographed on the film is intended to be photographed thereon in determined relation to the variable data. Such form matter may comprise a heading and an intermediate portion and a footing. A suitable light source is provided for trans-illuminating the form transparency.

In the operation of the machine, the general procedure is to place a mask in front of the form transparency. This mask is shifted by the operation of the machine into either of three positions. In the first position the heading portion of the form transparency is revealed and in position to be photographed upon the film. In the middle or second position of the mask, the intermediate portion of the form is revealed and in position to be photographed. In the third position of the mask the footing portion of the form transparency is revealed and in position to be photographed. The first operation is to record the heading portion of the form on the film. Film feed is then effected and subsequently a plurality of lines of variable data are recorded on the film. As the variable data is recorded there is also a recording of the intermediate portion of the form. This intermediate portion, for example, can comprise increments of separating lines. These increments of separating lines are successively recorded in step with the successive recording of lines of variable data and the number of such increments which are recorded will depend upon the number of lines of variable data which are recorded. Finally upon a group change in the records, total data is recorded on the film. After this total data is recorded there is a recording of a footing portion of the form. This footing portion again is derived from the form transparency with the mask in its last or third position.

From the foregoing, it will be apparent that forms of variable length may be recorded. The increments of the separating lines when joined together and upon development of the film provide in effect continuous extended separating lines. The length of these separating lines will, of couse, vary, depending upon the number of lines of variable data.

Accordingly, with the present machine, provision is made for photographing forms of varying length derived from a pattern source means which is provided in the machine, viz. the form transparency.

From the foregoing, it will be apparent that the forms may vary in length as they are successively exposed and recorded. The length of the form will be in a measure, dependent upon the number of lines of variable data which are exposed within the confines of a particular form. Stated differently, the spacing or interval between the heading portion of the form and the footing or terminal portion of a given form will vary dependent upon the number of lines of variable data to be recorded on that particular form.

In the operation of the machine substantially all of the operations are automatic. The operator merely starts the machine in operation, after which form data material is successively recorded. Variable data is successively recorded and when group members change on the records, the form data exposing means is re-adjusted so as to record the final component of the complete form, whereupon there is an automatic initiation of machine operations to record the beginning component of the following form together with resumption of the record feed so that record data may again be photographically exposed on the film. In lieu of the automatic operation above mentioned, provision is made for initiating certain operations manually, viz. under key control by the operator.

Figure 1:
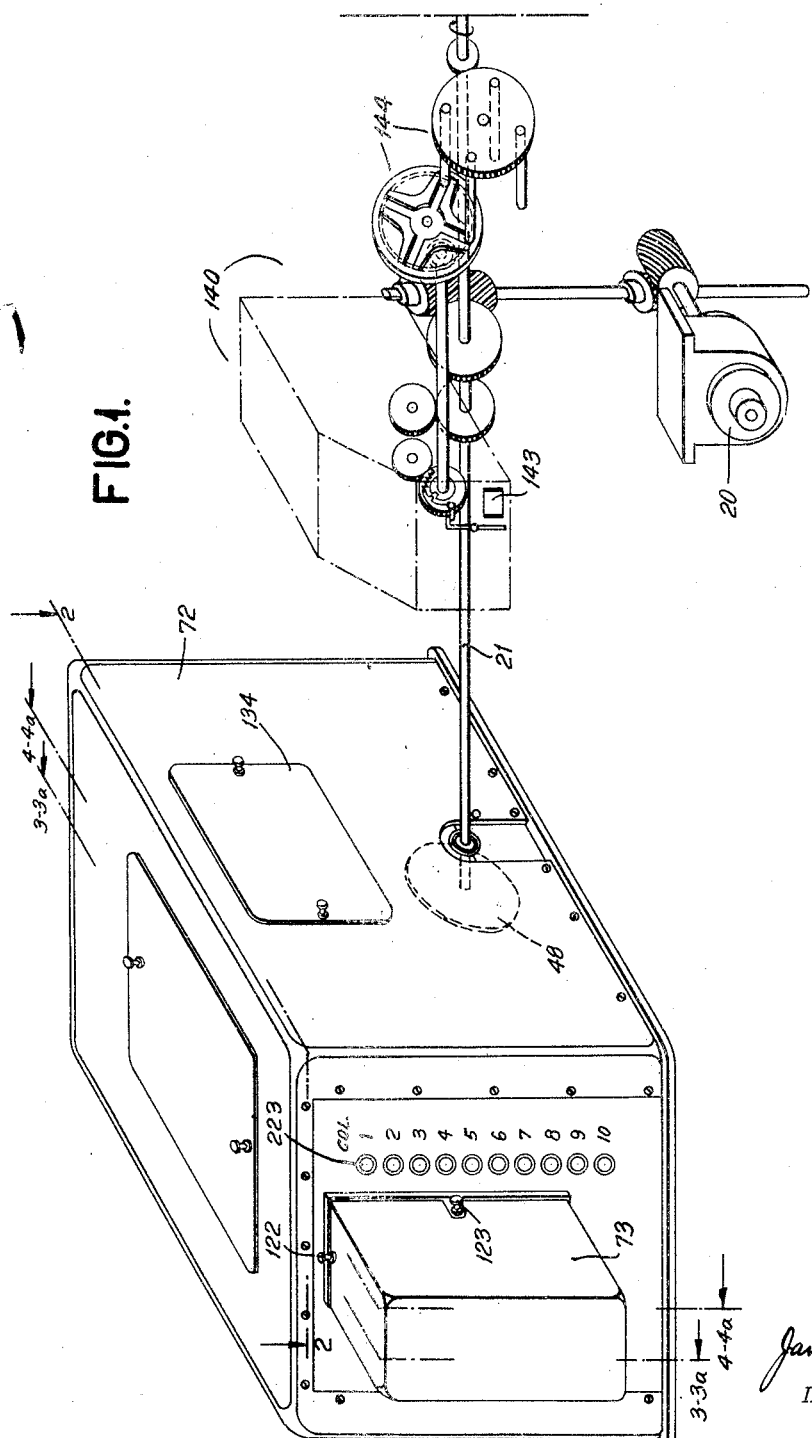

Referring now particularly to Figs. 1 and 1a, the machine in general comprises a record handling and reading unit which is shown in the extreme right in Fig. 1a. At the left of Fig. 1 there is shown the recording section or recording unit. The machine also includes an accumulating section, the location of which is shown diagrammatically in Fig. 1 just to the right of the recording section.

Referring to Fig. 1, 20 designates the driving motor which drives the main drive shaft 21.

Referring to Fig. 1a, fast on the shaft 21 is a gear 22 which drives a gear 23. Fast to gear 23 is a one-revolution clutch element 24 which is freely rotatable on a shaft 25. Clutch dog 26 is carried by a member 27 which is fast to shaft 25. The dog 26 is tripped into engagement with the notch in the clutch element 24 upon energization of card feed clutch magnet 28. Shaft 25, through suitable gearing drives the rotatable brush elements of the distributing commutators generally designated EM1. One of these commutators is provided for each column of alphabetical data to be recorded. Also fast to the shaft 25 are a number of card feed cams CF1 to CF18. The shaft 25 also drives distributors CD1 to CD5.

Gearing generally designated 29, drives the main drive shaft 30 of the card handling unit. This unit, see also Fig. 13, includes the usual card supply magazine 31 and discharge magazine 32. The unit includes card feed rolls 33 driven from shaft 30 by the helical gearing shown in Fig. 1a. Cooperating with the driven rolls and geared thereto are upper feed rolls 34. 35 designates the conventional picker driven from the picker drive shaft 36 which in turn is driven from the shaft 30 by the helical gearing shown in Fig. 1a.

Referring to Fig. 13, BI are the advance sensing brushes and B2 are the regular and main sensing brushes. These brushes cooperate with contact rolls 37 and 38. 39 and 40 are the usual card levers which close contacts 41, 42 respectively. When the card feed clutch magnet 28 is energized shaft 30 is set into rotation. Picker 35 withdraws a card from the magazine 31 and advances it in the bite of the first pair of feed rollers. Thereafter the train of feed rolls advances the card first to the advance brushes BI, thereafter under the regular brushes B2, and ultimately the card is fed to the discharge magazine 32.

Referring to Fig. 1a, gear 22 also drives a gear 23a which is fast to a clutch element 24a which is provided with two notches. Fast to shaft 25a is an element 27a carrying a clutch pawl 26a. This pawl is tripped into engagement with either notch of the element 24a upon energization of total clutch magnet TM. The shaft 25a drives a number of T cams TI to TI4. The shaft 25a also drives two distributors TDI and TD2 and an emitter EM4.

Accumulator

Referring to Figs. 1 and 14, 140 generally designates the customary Hollerith type of accumulator which is driven in the usual way from the main driven shaft 21. 141 is the customary readout (see Fig. 14). 142 is the usual accumulator magnet and 143 is the reset magnet for the accumulator. For further description of the accumulator unit, reference may be had to Lake and Daly U. S. Patent No. 1,976,617. The reset drive is provided in any suitable manner as by the Geneva drive generally designated 144 (Fig. 1). Full description of the operation of this reset drive may be found in United States patents, Nos. 2,045,437 and 2,049,690.

Recording section

Referring to Figs. 3 and 3a and 4 and 4a, 45 designates a base. Fast to the base are a pair of side plates 46 and 47 (see also Fig. 2). Suitable bearings in plate 46 (see Fig. 2) afford a journal for one end of drive shaft 21. This drive shaft through the gear 48 (see Fig. 4a) is adapted to drive a drum driving gear 49. The driving ratio of gears 48 and 49 is one to one. Gear 49 is fixed to one of the end hubs 50 of the character carrying drum. The hubs of the drum are rotatably mounted in bearings 51 in frame plates 46 and 47 (see Fig. 10). Fast to the hub section 50 are annular members 52 which support the character carrying drum 53. The drum is made of suitable light pervious material such as a transparent plastic. The drum is preferably rendered opaque on its surface except at the character displaying portions where the drum is transparent or translucent. In the drawings for clarity of illustration, the characters are shown opaque and the drum transparent but in actual practice the characters would preferably be transparent and the background surface opaque. The drum is provided with a plurality of columns of characters, one complete column being shown in the developed view (Fig. 16). This column of characters comprises the entire alphabet and the digits 9 through 0 inclusive, with the alphabetical characters interspersed between the successive digital characters. The various characters are so disposed that each different character has a predetermined differential position around the periphery of the drum. It may be mentioned that the drum makes one complete revolution during one card cycle, and with the drum in continuous rotation, i. e. rotating in the direction of the arrow (Figs. 15 and 16) the various characters are successively presented to exposing position. With the drum in normal or home position no character would be in exposing position; thereafter the various characters I, R, Z, etc. successively present themselves to exposing position. The drum is also provided with two zero characters (see Fig. 16) for reasons explained in the circuit description. For simplicity of illustration, only one complete column of characters is shown on Fig. 16 and other columns partially indicated. In practice there is a plurality of complete columns depending upon the columnar capacity of the machine.

Disposed within the drum and for trans-illuminating the characters thereon there are a plurality of gaseous discharge tubes such as neon tubes. These tubes are normally extinguished and when it is desired to record the character high potential is applied to a neon tube or tubes at the instant the desired character or characters are in exposing position. The tube will then be fired, the drum will be trans-illuminated and the particular character or characters which are at the exposing position will be recorded on a film, which film is disposed in a camera unit.

It may be mentioned that an individual neon tube 58 is provided for each column of characters. Inasmuch as the drum hubs are hollow, support for the neon tubes within the drum may be provided from outside the drum, the supporting parts extending through the hollow hubs of the drum. The hollow hubs also permit the passage into the drum interior of a cable for supplying the firing current to the various tubes.

Referring now to Fig. 11, 58 designates one of the neon tubes. Such tubes are generally U-shaped and their terminal ends fit into conductive socket elements 56, which are fixed in a block of insulating material 55. The block 55 is supported by brackets 54 which extend through the hubs of the drum to a support outside the drum. The rear of each socket element 56 is provided with a plug receiving portion 60 (see Fig. 12) which receives the plug tip connected to a wire in cable 64. It will be understood from Figs. 10 and 11 that there are a plurality of neon tubes disposed side by side, one being provided for each character column of the drum. Insulating separators 61 are provided between adjacent tubes to prevent illumination from one tube related to one column affecting other columns. In front of the drum there is a plate 62 provided with a central slot or aperture 63. This aperture plate which is between the drum and camera unit provides for the exposure of a single line of characters at a time.

The recording section of the machine has provision to record on the same film both form data and variable data, and the variable data is derived from the character carrying rotatable drum 53, described above.

Figure 3A:
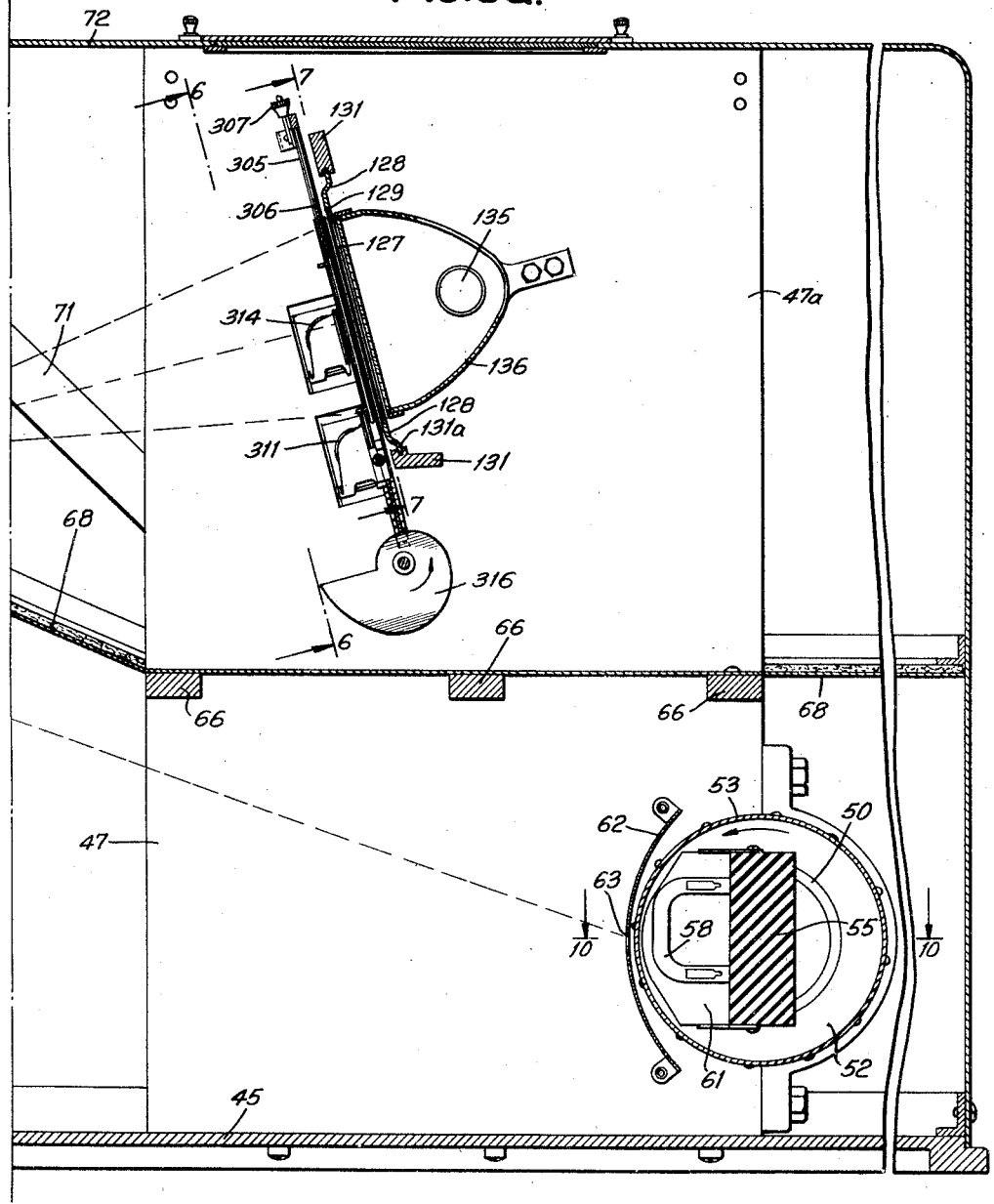

The side frame members 46 and 47 of the recording section carry cross bars 66 (Figs. 2, 3a and 4a). Supported on these bars 66 are upper side frame members 46a and 47a and also supported thereby is a horizontal separator plate 68 which divides the interior of the recording section into upper and lower enclosures. Also carried by the base 45 is a left hand frame plate 69 (see Figs. 3 and 4) to which the front frame plate 70 of the camera unit is suitably secured. Inclined braces 71 are provided between the plate 69 and the left hand cross bar 66. A cover 72 is carried by the base 45 and by the frame plate 69. The recording section may be considered as including three units. One unit is the camera unit which is provided with a housing 73 secured to frame plate 70. Another unit is the form data unit which is the unit above the separator plate 68 (Figs. 3a and 4a) and from which the form data is derived. The third unit is the variable data unit including the drum 53 which is disposed below the separator plate 68. The camera unit will now be described in detail.

The camera unit includes two vertically spaced lens and shutter assemblies generally designated 75 and 76 (Figs. 3 and 4). To the left of these assemblies is the film supporting and film feed assembly which is mounted on the support plate 77. Plate 77 is secured to frame plate 70 and carries a stud 78 rotatably mounting a film supply spool 79. Plate 77 also rotatably mounts three shafts 80, 81 and 82, having fixed thereon film feed sprockets 83, 84 and 85. These sprockets are adapted to feed the film generally designated F in Fig. 3, which film is provided with the usual sprocket holes. A takeup spool 86 for the film is mounted on a rotatable stud 87.

Film feed is effected upon energization and subsequent de-energization of a film feed solenoid 88 (Fig. 4). Energization of solenoid 88 lowers a linkage 89 which carries a feed pawl 90. This pawl is engaged with a ratchet wheel 92 which is rigid with the pinion 93. The rigidly connected gear and ratchet are rotatably mounted on a stud 94. The pinion 93 meshes with a gear 95 having a hub 96 (see also Fig. 5) which is rotatably carried on a stud 97. Also fixed to the hub 96 is a pinion 98 which is meshed with a gear 99 fixed to the shaft 81, which drives sprocket 84 (Fig. 3). Gearing 100 between the gear 99 and the upper sprocket shaft 80 transmits the rotation of the sprocket shaft 81 to sprocket shaft 80. Gear 99 fixed to the shaft 81 also through gearing 102, drives the lower sprocket shaft 82 and to which sprocket 85 is rigidly mounted. The lower sprocket shaft 82 also carries a pulley 103 which, through a belt 104, drives a pulley 105 fixed to the takeup spool shaft 87. Energization of the solenoid 88 lowers the linkage 89 and the pawl 90 carried thereby. Upon de-energization of the solenoid 88 a spring 106 restores the linkage and pawl to normal position. During restoring motion of the pawl the pawl rotates the ratchet wheel 92 for one step of advance. Such step of advance through the drive connections previously described, advances the film one line space.

Shaft 82 which carries the lower sprocket 83 is slotted at one end (see Figs. 4 and 5) to receive a winding key 107 normally disposed in retracted position as shown. This key is used to manually wind up the film F when the film is being inserted and removed from the camera unit.

Referring to Fig. 3, within the camera unit there is provided a lever 108 which is spring pressed and in contact with the film on the supply roll 79. When the film supply on the supply roll is substantially exhausted, member 108 swings to a clockwise position in which it enables contacts 109 to spring open. In the manner to be subsequently explained, the opening of these contacts interrupts the operation of the machine.

The shutter and lens assembly 75 (Fig. 4) is adjusted for a high speed snap exposure. This snap exposure is effected each time shutter trip 110 is moved up by the upward stroke of the plunger 111 of a shutter trip solenoid 112. Energization and de-energization of the solenoid 112 reciprocates the plunger and causes actuation of the shutter and also closes contacts 112a. The shutter and lens assembly generally designated 76 is adjusted for a so-called bulb exposure. This shutter is left open during recording and is intended to be manually closed when the recording unit is opened for inspection or repair or for form changing. The shutter of this assembly 76 is opened by moving a shutter operating element 114 upwardly and is closed upon return of the element to lower position. Element 114 abuts the top of a slide 115 having a pin and slot connection to a lever 116. This lever is fastened to a pivot 117 (see also Fig. 5). One end of this pivot is slotted for engagement with the key 118. With the parts in the position shown in Fig. 4, lever 116 is at its counterclockwise limit and the connected slide 115 is in upper position in which it holds the elements 114 in shutter open position. In the other position of the parts, lever 116 is at its clockwise limit and connected slide 115 is in lower position in which it permits element 114 to move to shutter closing position. A spring actuated impositive detent 119 coacts with the left hand end of lever 116 to maintain it in either of its two positions. Operation of the lever 116 and its related parts is effected by manual manipulation of key 118. By pushing the key in and turning it to rock the lever 116 clockwise from its position in Fig. 4, the slide 115 is lowered permitting 114 to move down and close the shutter. After the lever 116 has been thus rocked to its clockwise limit, it is held in position by detent 119. To return the lever 116 and related parts to shutter opening position the key 118 is pushed in and turned to rock the lever counterclockwise causing the parts to take the position shown in Fig. 4, in which the shutter assembly 76 is open. The detent 119 again maintains the parts in this position until the key 118 is again turned.

The housing 73 of the camera unit is detachably secured to frame plates 70 by a pair of thumb screws 122 at the top and bottom and by a pair of thumb screws 123 at the sides (see Fig. 1).

Referring to Figs. 3 and 3a, form data is exposed on the film F through the lens and shutter assembly 75. This form data is derived from a form pattern which is insertible into the form unit shown on Fig. 3a. The variable data derived from the character bearing drum is exposed on the film through the lens and shutter assembly 76. This variable data is alphabetic and numeric data selected under control of the record cards and the accumulator section of the machine. The general procedure is to first expose the heading portion of the form on the film. This is effected by a snap exposure of the shutter and lens assembly 75. Thereafter there are a plurality of successive exposures each exposing upon the film increments of vertical separating lines. These increments are derived from the form pattern. Thereafter the variable data derived from the character drum is exposed on the film through the lens and shutter assembly 76 which remains open during all variable data recording. The exposure of the variable data is effected in the manner previously explained, that is the individual gaseous discharge tubes 58 are fired. These tubes are disposed within the character bearing drum and selectively trans-illuminate the characters on the drum and effect exposure of such characters on the film. Accompanying each exposure of variable data there is a further exposure from the form pattern plate of the increments of separating lines. It may be mentioned that these increments as well as other form data derived from the form data plate are always exposed by a snap exposure of the lens and shutter assembly 75. Following exposure of the last line of variable data there will be an exposure of a footing for the form. A new series of operations may then be initiated which will start with the recording in the manner explained before of the heading on the next form.

It may be understood that means are provided to selectively bring into view for exposure, the different portions of the form pattern, i. e. the heading portion, the separation line increments and the footing portion. This means generally comprises a shiftable mask, the construction of which will be explained in greater detail hereinafter.

*Form unit*

The form unit provides for the recording of form matter or form data on the film. Such form data which is to be exposed on the film has to be changed from time to time. For this purpose a set of interchangeable form transparencies are prepared. These prepared form transparencies resemble lantern slides. The operator of the machine selects the desired transparency form from the previously prepared set and places it in a slide carrier in the form unit.

Referring to Figs. 3a, 8 and 9, a transparency plate 127 bears the form pattern. This plate is made of transparent material which may be in the form of a plate or film. In practice the plate or film is opaque except where the form matter appears. For purposes of illustration, however, the plate or film is shown transparent and the form manner opaque. A slide 128 of open rectangular construction and formed with a recess 128a (see Fig. 8) bounding the opening, is adapted to carry the form or transparency 127. This plate fits into the recess 128a and is held in place by spring clips 129 mounted on slide 128. The slide 128 which affords a mounting for the transparency plate is slidably insertible in upper and lower horizontal bars 131 formed with guide channels 131a for slidably receiving the upper and lower edges of the slide 128. The ends of the bars 131 are suitably secured to the side frames 46a and 47a (see also Fig. 2). It will be understood that the left ends of the channels 131 (Fig. 8) are closed to provide an abutment for the left side of the slide 128 and limit its insertion into the slots. The right hand ends of the channels are opened so that the slide may be insertible from the open end. To retain the slide in inserted position, a lever 133 is spring urged into position against the shoulder on a projection 128b which forms a handle for the slide. Access to the interior of the form unit housing is provided by removing a closure plate 134 (Figs. 1 and 2) detachably fastened to the right side of the casing 72 of the recording section. To remove the slide 128 together with the form plate carried thereby, the closure plate 134 is removed and the lever 133 (Fig. 8) rocked downward to remove it from the path of the shoulder on the slide. The slide may then be freely retracted from the channeled bars 131. The transparency plate 127 may then be removed and replaced with another one. To re-insert the slide the lever 133 is held out of the way and the slide is inserted in the channel bars 131. The lever 133 then retains the slide in position. The form plate 127 when in recording position is adapted to be transilluminated by a light source 135 located within a reflector 135 (see Figs. 2, 3a and 9). The form matter on the form transparency plate may comprise any desired heading or footing data and will also include suitable lined portions to provide for the exposure of separating lines on the completed form.

It will be understood that while different interchangeable transparency plates 127 are of the same size the form patterns on these plates may be of different sizes.

After the film has received an exposure of the heading portion of the form the film is fed downwardly and lines of variable data derived from the character carrying drum and successive increments are exposed on the film within the area of the form.

Before describing the details of the mask construction it may be explained that on each form transparency there are three general sub-divisions. One is the heading portion which may contain any desired legends or other data. This portion on the transparency in the diagrammatic illustrations, Figs. 22 to 28 inclusive, and in Fig. 8, is indicated with a legend "Head." Another portion of the transparency is the footing portion which is indicated with the word "Foot." This footing portion is preferably disposed one line space above the head portion. The third portion of the transparency is the separating portion. This comprises a series of vertical lines substantially one line space in length and such separating lines are designated LL on Fig. 8 and on the diagrammatic views, Figs. 22 to 28 inclusive.

In the exposure of the form data there is provision for first exposing the heading, thereafter the separating lines are exposed and finally there is an exposure of the footing. To provide for this selective exposure, a mask is provided, this mask has three different vertical positions. In its first position the mask unmasks the heading and obscures the separating lines and the footing on the transparency plate. In its second position the mask conceals all portions except the separating line portions on the transparency plate. In the third position the mask displays the footing and the separating line portion, but masks out the heading portion.

Since various forms may require different lengths of headings, different lengths of footings, etc., provision is made to provide for using different masks in the machine. The masks will be proportioned according to the length of the footing or heading or both and the spacing between them, etc. Accordingly, provision must be made not only for securing the requisite shifting movements of the mask, but provision should also be made for the interchanging of masks one with another.

Referring now to Figs. 6 and 7, 7a and 7b, 300 designates two channel members which are fixedly secured to frame members 46a and 47a. The channel members 300 receive a mask carrier 301 or slide which is generally in the form of a rectangular frame (Fig. 7). Suitable rails 302 on the sides of the mask carrier 301 fit in the channels of members 300. At the top of the mask carrier there is a member 303 which is pivoted at 304 so that the member can be swung upwardly to permit removal of the mask 306. The side members of the mask carrying slide 300 are channeled as indicated at 305 in Fig. 7b and the upper cross member of the slide is open as indicated at 305a. When a mask is to be removed and replaced by another one, the operator loosens a latch 307 to the right from the position shown in Fig. 7 and thereafter the member 303 may be swung upward about its pivot to permit a sliding out of one mask and the sliding in of another one.

Referring again to Fig. 6 and to the previous description, it will be recalled that the mask has to assume three different positions. According to the present embodiment provision is made for retaining the mask and its associated slide in each of three different positions. For this purpose each mask unit 306 is provided with two pins 308 and 309. With the parts in the relation shown in Fig. 6, which is the position for exposing the heading, pin 308 is in contact with an armature 310 of a magnet 311. With these parts in this position the mask will reveal the heading on the transparency but obscure the other portions, viz. the foot and the separating lines. Upon energization of magnet 311 the armature 310 will be drawn away from pin 308, whereupon the mask and its associated slide will drop by gravity aided by springs 312 and the mask in its slide will then assume a position with pin 309 resting upon the armature 313 of magnet 314. This is the second position of the mask and in this position the mask will reveal the separating lines only. When magnet 314 is energized, the armature 313 will be drawn out of the path of pin 309, whereupon the mask and its associated slide will descend further to lowermost position. In this position a roller 315 carried by the slide 301 will touch a restoring cam 316. It will be understood that the mask is retained in position with 308 engaging armature 310 for a single exposure. After such single exposure is made there may be repeated exposures with pin 309 resting upon armature 313 and in the final position with 315 resting on cam 316 there will be a single exposure.

It will be understood that the contour of the mask may vary and that with different masks the pins 308 and 309 may be disposed in different positions depending upon the particular form requirements which have to be provided for.

The purpose of cam 316 is to restore the mask to its upper or first position. When the mask is restored to this position the pin 309 again rests on the armature 310 and retains the mask in upper or first position. For actuating cam 316 the following train of mechanism is provided. 316 is fast to a shaft 317 which is journaled in the frame members 46a and 47a. Referring now to Fig. 4a, gear 49 drives a gear 318, connected to shaft 318a thereby driving the gear 319 also connected to this shaft. 319 in turn drives bevel gears 320 and 321 which through idler bevel gears 321a drives a gear 322. Fixed to the hub of this gear 322 is a notched element 323 of a one-revolution clutch. Both the gear 322 and the clutch element 323 are rotatably carried by the shaft 317 to which the restoring cam 316 is fixed. Fixed to the shaft 317 is an arm 324 which pivotally carries a clutch dog 325. The arm and clutch dog are normally latched by an armature latch 326 operated by a clutch magnet 327. On energization of the clutch magnet a one-revolution clutch engages and the shaft 317 is rotated through one revolution. This rotation of the shaft restores the mask to first position.

*Plugging—general*

Plug connections are provided between the desired 150 sockets (Fig. 19a) connected to the pre-sensing brushes B1 to the sockets 151 connected to related EM1 emitters. These connections prepare sensing circuits for closure when the related B1 brushes sense the zoning indicia in related card columns. Brushes B2 which sense intra-zoning designations are wired to plug sockets 152. From these sockets 152, plug connections are made to sockets 153 which are connected to the accumulator magnets 142. For the usual group control operations plug connections are made from sockets 150 connected to brushes B1 to sockets 154 and further plug connections are made from sockets 155 to sockets 152. Further plug connections for group control purposes are made from sockets 156 to 157. Other plug connections will be made from the desired ones of the 152 sockets to sockets 158 which connect to relays generally designated E. It will be understood that one of these relay coils E is provided for each column in which recording is to be effected and for simplicity in the circuit diagram only a few of such relay coils E are shown.

It may be explained that with the present machine the neon tubes are fired with relatively high voltage and it is desirable that such high voltage be isolated from the relatively low voltage designation sensing or firing control circuits. Accordingly, the related E relay coils are utilized, these being energized by the low voltage sensing circuits. The relays E and other controls in turn are utilized to connect up the neon tubes to receive high voltage current and to connect such tubes for recording as will be subsequently explained. Each neon tube has its opposite terminals wired to a pair of plug sockets 160 and 161 (Fig. 19a). To place a neon tube in a firing circuit, a plug connection is made from a 161 socket to a 162 socket and a connection is made from a socket 160 to a socket 163. It will be understood that as many neon tubes are utilized as are necessary for the required number of columns to be recorded. As stated before, there will be one neon tube for each column of characters on the drum and while only a few neon tubes have been shown on the circuit diagram for simplicity of illustration, it will be appreciated that many more could be provided. Other plug connections are made between sockets 164 and sockets 165. These connections are made for the purpose of providing charging circuits for certain condensers. The purpose of these condensers will be subsequently explained.

To provide for alphabetical recording, zoning circuits must be plugged up. These circuits include the previously described plug connections between the sockets 150 of brushes B1 and the sockets 151 of emitters EM1. In practice there will be as many emitters EM1 plugged up as there are columns of alphabetical characters which are to be recorded.

For total recording, plug connections are made between sockets 166 and 167 (Fig. 19b). Sockets 166 are wired to the readout generally designated 141 and sockets 167 are wired to the sockets 162 (Fig. 19a). Referring to Fig. 19a, it may be mentioned that the right hand bank of condensers with the related neon tube 58 is utilized to record a total symbol on the film. Such bank of condensers has the socket 162 wired to one side of a pair of T4 contacts which are closed on a total-taking operation.

In practice it will be understood that as many banks of condensers are provided and as many neon tubes are provided as required for the number of columns to be recorded on the film. Four banks of condensers are shown on Fig. 19a with four neon tubes directly associated therewith. Two additional neon tubes have also been shown on the circuit diagram. In practice as many banks of condensers and as many neon tubes will be provided as required.

Total data may be recorded in the same columns in which numerical data is listed. If desired, the plug connections from the total recording sockets 166 can be plugged to condenser banks and related neon tubes which are not utilized for item recording so that a total may be recorded in columns offset from the list of items pertaining to the total.

Film feed control means

Means are provided to control film feed so as to bring sections of the film into proper position for recording the form data and to also bring it into variable data recording position. The film feed control means comprises a stepping switch generally designated A and shown in Figs. 19b and 20. This stepping switch is of the type shown in United States Patent No. 1,569,450 to Bohlman and has the same general mode of operation as the switch therein described. Such stepping switch includes a stepping magnet 195 and a release magnet 236. The stepping magnet armature has a spring toggle actuated contact 170 associated therewith. Such contact does not snap open until the stepping magnet armature has moved substantially all the way and the contacts do not reclose until the armature is substantially restored. The switch has a contact arm 200 adapted to successively engage contact segments 200s. The arm 200 is rigid with a ratch toothed segment 200r which is engaged by a stepping pawl 197. When the stepping magnet 195 is energized, it depresses the pawl and causes opening of contacts 170. The stepping magnet is then de-energized and pawl 197 is permitted to return to upper position during which movement the pawl advances segment 200r and connected contact arm 200 one step. When the arm 200 is in home position it holds contacts 208 closed and contacts 209 open. As soon as the arm receives its first step of advance, it permits contacts 208 to open and 209 to close. At the end of the first step of advance of 200 it engages the first of the segments 200s. Thereafter successive steps of advance of the arm move it from one segment to the next. Energization of the release magnet 236 will release arm 200 and connected ratchet 200r for spring actuated return to home position. The contact segments of switch A are wired to double plug sockets generally designated 172.

The manner in which the different sections of form data are recorded and of film position for variable data recording will now be explained.

Form data

Referring to Figs. 8 and 22 to 28, the form data appears on a plate or sheet 127. The form data is light-pervious; i. e., transparent or translucent and the remainder of the plate is opaque so that only the form data will be projected to the film when shutter trip magnet 212 is operated. Typical form data will comprise a heading, indicated by the legend "Head" in a box. Such form data will comprise, further, a suitable footing, indicated by the legend "Foot" in a box. Further, the said form data will comprise short vertical lines, usually one line high, and designated by the character LL. As a rule, at least two such lines LL will be used to provide for left and right side boundary lines of the eventually completed form record. In addition, intermediate short lines LL may be used, as shown, to provide for recording of intermediate data field separation lines.

The steps for effecting recording of the form data and of variable data will be briefly outlined. Initially, the mask 306 is in first position (Figs. 6 and 22), concealing all but the heading portion of the form data. While the mask is in this position, the shutter trip magnet 112 will be operated and the heading recorded on the film. The position of the film during the recording of the heading is designated, for convenience, Film position 1. It may be mentioned at this time that the lens systems will reverse the images recorded on the film with respect to their patterns on the form sheet and the character patterns on drum 53. Thus, the top of the heading image on the film is the counterpart of the bottom of the heading on the form sheet. It is desired to record variable data line by line to follow the heading image and to record separation lines on the film, such lines being composed of increments derived by successive exposures of the short lines LL while the film is in successive line positions. As may be understood from Fig. 22, the lens system of assembly 15 is adapted to project an image of short lines L some distance below the projection of an image of the heading. It is desired to record the first image of lines L directly above the image of the heading, i. e. the bottom of the image of the short lines must be recorded directly at the top line of the heading recorded on the film. Accordingly, after the heading has been recorded, the film must be fed down through the distance between the top of the heading image field and the bottom of the short lines image field. This distance is equivalent to the distance between the bottom of the heading on the form sheet and the top of the short lines on the form sheet and varies in accordance with the particular form data being used. In the example shown in Fig. 22, the distance between the bottom of the heading and the top of the short lines on the form sheet is equivalent to fourteen lines of the film; i. e., the sum of 7 (heading height) +1 (space between heading and foot) +5 (footing height) +1 (height of short lines L). Accordingly, after the heading is recorded, the film will be fed down fourteen lines into film position 2. At any desired point of the interval in which such feed takes place, the mask is moved to 2nd position, Fig. 23. In this position, all the form data except the short lines L on the form sheet are concealed. When the film has been fed down the required distance to its second position, the shutter magnet 112 is again operated and recording of the first increment of the separation lines takes place, such increment being the image of the exposed short lines L on the form sheet.

The film now has recorded thereon the heading and the first increment of the separation lines. This first increment is within the first line space following the heading. It is desired to record in this first line space, and between the separation lines, the first line of variable data. When the film is in position 2 (Fig. 23), the first line space following the heading is within the scope of the image field of the short lines LL on the form sheet. Due to the construction of the two lens systems and their spacing, the image field of a line of variable data from the drum 53 is ten lines below the image field of the short lines LL. It may be mentioned at this time that while the form data may vary on the different plates, the short lines LL, in order to simplify the plugging and to save film, should in all cases be one line high and be in the same definite predetermined photographing position, with its image field ten lines above the variable data recording line. In this manner, the distance between the image field of the short lines and the variable data image field will always be fixed and feed of the film from position 2 (Fig. 23) to first variable data line recording position (Fig. 24) will always be the same, regardless of variation in form data or heights of heading and footing and their intervening spacing. It is necessary then, after the first increment of the separation lines has been recorded to feed the film from its position in Fig. 23 to its position 3 in Fig. 24 in order to bring the first line space following the heading into variable data recording position. Since this first line space while the film is in position 2 (Fig. 23) is within the image field of the short lines LL and since there is a fixed distance of ten lines from the bottom of the latter image field to the top of the variable data image field, the film must be fed down ten lines from its position in Fig. 23 in order to bring the bottom of the first line space following the heading to the top of the variable data image field. The film must be fed down one more line in order to bring the first line space following the heading into the scope of the variable data image field which is one line high. Thus, the film must be fed down from position 2 to position 3 a fixed amount of eleven lines; i. e. ten (the fixed distance between the short lines image field and the variable data image field) +1 (the height of the variable data image field). This feed of eleven lines is the same for all cases regardless of variations in form data.

When the film has been fed down to film position 3 shown in Figs. 24 and 25, the first variable data line may be recorded, as indicated in Fig. 25. It is desired to accompany each variable data line recording by a recording of an additional increment of the separation lines. Since the first variable data line will be recorded with the film in position 3 and since the short lines image field is ten lines above the variable data image field, there is a distance of ten line spaces between the position in which the first increment of the separation lines is recorded (see Fig. 23) and the position in which the increment is recorded when the film is in position 3. In order to avoid a break in the separation lines, means are provided to effect successive exposures of the short lines L on the form sheet as the film is moved to position 3. The first of such exposures occurs as the film reaches position 2 (Fig. 23). The film then feeds down one line space and after this one line spacing has terminated, a second exposure of lines LL occurs. The film then feeds down a second line space and this is followed by a third exposure of the short lines. In this manner, exposure of the short lines occurs and a feed step of the film follows until a series of eleven such exposures have occurred and the film has fed down ten line spaces from position 2. At this point, the series of successive exposures of the short lines is terminated but the film advances the eleventh line space to bring it into position 3. At this time, there will have been eleven exposures of the short lines and eleven steps of line spacing of the film from position 2 to position 3. The first line of the form following the heading will then be in variable data recording position and ten lines thereabove, the image field of the short lines LL will span the film line following the recorded eleventh increment of the separation lines. The first variable data line will then be recorded under control of the first card of the card group and after this has occurred, the short lines LL will be exposed to record the twelfth increment of the separation lines, as indicated in Fig. 25. Following the latter operation, the film will then be fed down one line space to prepare it for receiving the second line of variable data and the next increment of the separation lines. These operations are repeated for each record in the group. When the record group has been exhausted, the card feeding means will stop. A total cycle will then be initiated. In the first part of the total cycle, the total will be recorded on the line space brought to variable data recording position after recording of the last card item. The short lines image field will at this time span the line following the last recorded increment of the short lines but recording of the next increment in such following line will not occur as yet. Before such short lines exposure takes place after total recording, the mask is shifted under total cycle control to third position in which it uncovers the footing as well as the short lines on the form sheet while the heading still remains masked. It may be mentioned that in all examples of form data, patterns used herein, the footing, regardless of its height, always follows directly below the short lines on the form sheet. Due to reversal by the lens system, the image of the footing will be directly above and adjacent the image of the short lines should exposure occur with the mask in third position. After recording of the total, the mask is brought to third position and the shutter trip magnet 212 energized, concurrently exposing both the now unmasked footing and short lines. As a result, the last increment of the separation lines is recorded and the footing is recorded directly above the end of the separation lines, as indicated in Fig. 27.

At this stage, were the heading to be unmasked and exposed, the bottom line of its image would strike the film one line above the top of the footing image since there is a spacing of one line between the counterparts of these heading and footing lines on the form sheet. However, the film after the footing has been recorded (see Fig. 27) is automatically advanced one line space. Hence, if the heading were then exposed, it would be recorded a distance of two lines above the footing. During the total cycle, the total is recorded, the footing and last increment of the separation lines are recorded, and the film then is advanced one line space. Following recording of the footing and last increment of the separation lines, the mask is restored under control of total cycle means to its first position. A new series of operations may then be started. The first operation will cause energization of shutter magnet 112 to record the heading a distance of two lines above the previously recorded footing, as shown in Fig. 28. The film will then be fed in the manner described before to position 2, then to position 3, and thereafter will feed in accordance with the number of cards in the new group, Increments of the separation lines, variable data recording, total recording, and recording of the footing will again take place in the manner explained. The overall length of the completed form, in each case, will vary with the number of lines of variable data derived from the cards, this being dependent, in turn, on the number of cards in the group.

*The plugging of switch A*

Each form data sheet or plate may be kept in an envelope marked with the heights of the heading, footing, and intervening space. If desired, such information may be given on a sheet accompanying the form data plate. In order to plug up switch A, the operator is required to bear in mind only one variable value which may be referred to as the position 2 variable. This variable value is the distance which the film must feed from position 1 to position 2 (see Fig. 22). As previously explained, this distance is the sum of the heading height, the footing height, the height of the space between them, and the height, equal to one line, of the short lines L. Thus, in the example considered in connection with Figs. 22 to 28, the sum of these heights is 14; i. e., 7 (heading) +5 (footing) +1 (intervening space) +1 (lines L). Hence, in this example, the position 2 variable is 14. The operator plugs up the socket 172 of the segment marked with the number of the position 2 variable to a plug socket 174 which is wired to shutter trip magnet 112. Thus, in Fig. 20, showing the plugging for the example with which Figs. 22 to 28 are concerned, the position 2 variable is 14 and the operator plugs up the socket of segment "14" to plug socket 174. This will cause successive recording of the increments of the separation lines to begin as the film reaches position 2, a distance of fourteen line spaces down from position 1. In a manner explained later, each exposure of the increments L causes concomitant initiation of line spacing of the film and is followed by a step of advance of the switch arm. As previously explained, a series of eleven exposures of the lines L is to be made as the film moves to position 3. The first such exposure takes place as the switch arm 200 is engaged with the segment 200s marked with the number corresponding to the position 2 variable. Ten more such exposures are to occur to complete the series of eleven exposures of lines LL. In order to provide for these additional ten exposures, the operator plugs up the ten sockets 172 following the one connected to the position 2 variable segment in series with one another and with the socket 172 of the position 2 variable segment. The first nine sockets 172 of the ten such sockets following the position 2 variable socket are plugged serially with one another and with the position 2 variable socket by plug wires such as 172a. The tenth of the said following sockets 172 is plugged serially to the preceding socket 172 through plug wires from these to latter sockets to plug sockets 176 and 177 wired to opposite sides of a coil 178. In the example, where the position 2 variable is 14, the sockets 172 of the segments numbered 14 to 24 are thus plugged up in series with one another, with the sockets of segments 23 and 24 being serially connected through the plugging to sockets 176 and 177 as explained above. Due to the serial plugging of sockets "14" to "24," as the switch arm traverses the segments wired to sockets 14 to 24, a series of eleven exposures of lines L will be effected. Following the last such exposure, the switch arm will step to the next segment and the film will advance one line space. Thus, at the end of the above operations which started with the switch arm in position 14 and ended with the arm in position 25, the film will have advanced eleven lines from film position 2 and will be in film position 3; i. e., in variable data recording position.

In addition, the operator in all cases plugs up the first socket 172 to a socket 180. Any two adjacent ones of the sockets 172 between the first socket 172 and the socket 172 of the segment corresponding to position 2 variable (but not including the latter socket) are plugged up to opposite sockets 181 and 182 of a mask control magnet 311 (see also Fig. 6). In Fig. 20, for instance, sockets 172 of segments "8" and "9" are plugged up in series by plug wires such as 172a those sockets 172 beginning with the first one and terminating with the one preceding the socket of the segment which corresponds to the position 2 variable, omitting, however, such plug wire 172a between the two adjacent sockets which have been plugged up to sockets 181 and 182.

*Circuit diagram and operation*

Assuming perforated cards are in the supply magazine, the operator first closes main line switch 190 supplying current to lines 191 and 192 (Fig. 19c). The current illuminates the lamp 135 (see Figs. 19c and 9). The circuit for lamp 135 is from line 191, through lamp 135, through switch 193 to line 192. The transparency plate 127 in the form recording section of the machine is now trans-illuminated and form data may be recorded on the film in the following manner. It will be assumed that the camera unit has been properly loaded with film prior to these operations. The mask will now be in position 1 (see Fig. 22) and in this position the heading alone will be displayed. The operator depresses a key 194 (Fig. 19b). Depression of this key closes its contacts and establishes a circuit from line 192, through shutter trip magnet 112, through the key controlled contacts 194a, through stepping magnet 195, and back to the other side of the line. Energization of the shutter trip magnet 112 (see also Fig. 4) causes exposure and recording of the trans-illuminated heading upon the film. When the key 194 is released, magnet 195 is de-energized and spring 196 restores the armature and the actuating lever 197 of the stepping switch so that the arm of the stepping switch is advanced from home position to the first segment position.

Referring to Fig. 4, when shutter trip magnet 112 is energized, contacts 112a are closed. Upon closure of such contacts (see Fig. 19b) a circuit is completed to energize the film feed magnet 88. Upon release of key 194 (Fig. 19b) and upon opening of contacts 194a, magnet 112 is de-energized, contacts 112a open and film feed magnet 88 is de-energized. De-energization of this magnet causes one line space of film feed to be effected. Concurrently, with the de-energization of magnet 88 the opening of contacts 194a will break the circuit to the stepping magnet 195. Pawl 197 returns and causes a step of advance of the arm 200 of the stepping switch bringing it into contact with the first segment.

Figure 6:
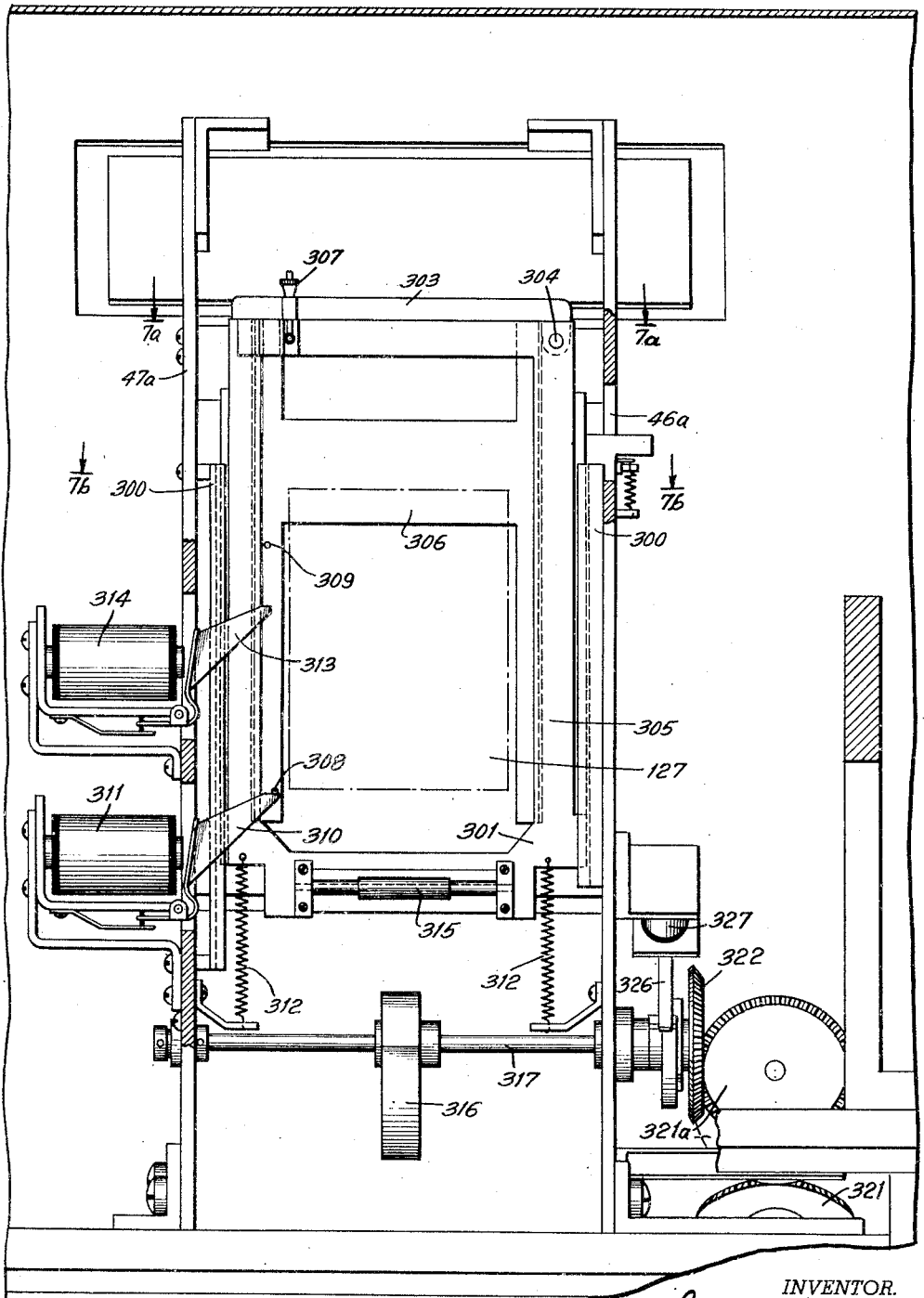

It will be recalled that after recording of the head in the example illustrated in Fig. 22, it is necessary to feed the film 14 lines spaces into position to receive the recording of the first increment of the separation lines. The feed for the first of such line spaces was described above. The feed for the remaining 13 line spaces of the film is provided for as follows: Upon the engagement of arm 200 with the first segment, a circuit is completed from line 192 (see Fig. 20), through film feed relay C to a socket 180, thence via plug connection to the socket 172 connected to the first segment, through the switch arm 200, through contacts 198, through contacts 170, through stepping switch magnet 195 to the other side of the line 191. Energization of film feed relay C closes relay contact C1 (see Fig. 19b) and a circuit is established to re-energize film feed magnet 88. The energization of 195 will cause the toggle switch contacts 170 to open, thereby interrupting the circuit to the stepping switch magnet 195. Upon de-energization of 195, the arm 200 of the stepping switch advances to the next stepping position. As the switch arm 200 moves off the first segment towards the second segment, the circuit of relay C is broken so that the C1 contacts open causing de-energization of film feed magnet 88. This causes the film to advance another line space. Due to the serial plugging between sockets 172 of segments 1 to 8 the successive engagement of the segments by arm 200 occurs in the manner described before and relay C and magnet 195 are successively energized and de-energized. Each such energization and de-energization of relay C results in a further step of film advance and each energization and de-energization of magnet 195 causes stepping of the switch arm 200. When the arm 200 moves to engagement with segment 9, a circuit is completed from line 192, through film feed control relay C, socket 180, plug connection to the first socket 172, then through the serial plug connections 172a, to the socket of segment 8. From the latter socket, the circuit continues through the plug connection to the socket 181, thence through the mask position control magnet 311 to a socket 182 and through a plug connection to the socket of segment 9. From this point the circuit is completed in the same manner as before through the stepping magnet 195. The circuit just traced causes energization of relay coil C and magnet 195 for the same purposes as previously explained. In addition the circuit has also energized magnet 311. Referring to Fig. 6, energization of magnet 311 withdraws its armature 310 from the path of pin 308 on the mask 306. The mask thereupon drops to its second position in which pin 309 in the mask abuts the armature 313 of the other mask control magnet 314. As the contacts 170 related to stepping magnet 195 open, this magnet de-energizes, the arm 200 steps to the tenth position while coil C de-energizes and the film is advanced one line space. At this point the arm is on the tenth position and the film has been advanced a total of 10 line spaces. A circuit to initiate another step of advance of switch arm 200 and another line space feed of the film is now completed from line 192, through relay coil C, plug socket 180, via plug wire to the first socket 172, through the serial plug connections 172a, plug wire to socket 181, magnet 311, socket 182, plug wire to socket 172, plug wire 172a to socket connected to segment 10, switch arm 200, contact 198, contact 170, stepping magnet 195 to line 191. The contacts 170 related to stepping magnet 195 open as previously and with this magnet de-energized the arm 200 steps to the eleventh position while the coil C de-energizes and the film is advanced one line space. Due to the serial plugging between sockets 172 of segments 1 to 13 the successive engagement of the segments by arm 200 occurs in the manner described before and relay C and magnet 195 are successively energized and de-energized. Accordingly, further steps of film advance occur in the previously described manner until the arm 200 contacts segment 14. At this point the film has been advanced a total of fourteen lines from film position 1 shown at the top of Fig. 22 to film position 2 shown at the bottom of Fig. 22 and also in Fig. 23. The mask is now in its second position displaying only the short lines LL and concealing the heading and footing portions of the form plate. With the film advanced to position 2, the machine is ready to record the first increment of the separation lines, such increments to be derived from the short lines LL.

At this point the arm 200 is on switch segment 14, the socket of which as previously explained, is plugged to socket 174 leading to shutter trip magnet 112. The circuit will thereupon be established from line 192, through magnet 112 to socket 174, plug wire to 172 of segment 14, arm 200 and as before, through the stepping magnet 195 of the switch, to the other side of line. Energization of 112 causes exposure of the short separating lines upon the film. In the manner explained before, energization of shutter trip magnet 112 closes contacts 112a (see Fig. 19b) which results in energization of film feed control solenoid 88. At this stage the first increments of the vertical separation lines have been recorded (see Fig. 23) and ten more such successive increments must be recorded before the film reaches variable data line recording position. The energization of magnet 195 is followed by its de-energization owing to the opening of contacts 170, causing arm 200 to advance to the next segment, i. e. segment 15. The socket on this segment is connected by one of the serial plug connections 172a to the socket of segment 14. Accordingly, when the arm 200 reaches segment 15 the circuit previously traced is re-established extending, however, through the segment 15. Short line recording and film feed and stepping of the switch again occur. These operations are repeated as the arm 200 steps from segment 15, to segment 16, and from this segment the next segment and so on until the arm reaches segment 24. Upon engagement of arm 200 with segment 24 a circuit is established from line 192, through shutter magnet 112, plug socket 174, the plug wired to the socket 172 of segment 14, then via the serial plug wiring 172a to the socket 172 of segment 23. The circuit proceeds from this socket through a plug wired to socket 176, thence through a card feed control relay 178 to a socket 177, thence via a plug wired to socket 172 of segment 24 and through the switch arm 200 and through the path previously traced, through the stepping magnet 195, to the other side of the line. The circuit just traced causes the recording of an increment of the separation lines and initiates feed of a film for a line space and also advance of arm 200 to the next segment. The circuit also has energized the card control relay coil 178.

At this stage the film is in position 3 shown in Fig. 24 with the first line following the heading at the variable data line recording position. Further eleven increments of the separation line have been recorded.

It will be noted that the film has fed down to third position from second position a total distance of eleven lines. With the film in third position the first line following the heading is at the variable data recording line. The image field of the short lines LL is ten lines above the variable data line position and between the short lines image field and the heading, 11 of the increments of the separation lines have been recorded. The machine is now ready to record the first and following lines of variable data under control of the record cards. Accompanying each variable data recording there will be a recording of the increments of the separation lines. It will be noted that due to the successive recording of increments of the separation lines while the film is advancing from position 2 to position 3, there will be no break in the separation lines. As the film was moved to position 3, it will be recalled that the card feed control relay 178 was energized. Such energization of coil 178 initiates card feed as follows. Upon energization of relay coil 178, contacts 17a (Fig. 19c) close and energize relay coil J. This may be termed the card feed holding relay. The circuit is from line 191, through contacts 178a now closed, relay coil J and back to line 192. Relay J is maintained energized by a stick circuit through stick contacts J1 and cam contacts CF11. Closure of relay contacts J2 (Fig. 19c, upper left) completes a circuit to energize the card feed clutch magnet 28 as follows. From line 191 (Fig. 19c), through the series of normally closed relay contacts L1, relay contacts P1 now closed, through relay contacts J2 now closed, through cam contacts T12, film lever contacts 109, and in parallel through a relay coil Q and card feed clutch magnet 28 to line 192. Energization of card feed clutch magnet 28 (Fig. 1a) causes the card feeding mechanism to function and cards are fed in succession one by one. During the first card feed cycle provision is made for restoring switch arm to home position. This operation is effected in the following manner. Upon closure of cam contacts CF18 (Fig. 19c) a circuit is established from line 191, through CF18, through coil X, to line 192. Coil X when energized, closes stick contacts X1, which establishes a stick circuit extending back to line, through the now closed contacts 209 (the switch arm being at this time away from home position). Coil X when energized, closes contacts X2 (Fig. 19b) establishing a circuit for restoring magnet 236. With 236 energized, the arm 200 and connected ratchet 200r swing back to normal home position. In this home position contacts 209 open and 208 reclose. The opening of contacts 209 breaks the stick circuit of coil X. During restoration of the stepping switch, contacts 198 are retained open by restoring magnet 236 to break the circuit connection between arm 200 and magnet 195, so as to prevent completion of circuit through the arm as it wipes the segments on the way back to home position 1. Towards the end of the first card feed cycle card lever contacts 41 (see Fig. 13) close and energize relay coil M (Fig. 19c). Relay M is maintained energized by a stick circuit through stick contacts M1 and cam contacts CF3 when the card lever contacts 41 open up between cards. Relay contacts M2 close to complete a circuit from line 191, series relay contacts L1, relay contacts P1, contacts M2, stop key contacts 210, relay contacts Q1, film lever contacts 109, and in parallel through magnet 28 and relay coil Q to line 192. As long as cards are feeding and the card lever relay coil remains energized, the card feed clutch magnet 28 will remain energized and keep the card feed in operation. During the following cycle, the zoning designations derived from the records are set up on relays for the control of recording operations on the next succeeding cycle. Assume a "11" zoning hole is punched in a record. Under such conditions the circuit for energizing the zone relay coil is as follows. From line 191 (Fig. 19a), relay contacts M3, cam contacts CF16, contact roll 37, through the 11th hole in the record, through one of the B1 brushes, through one of the brushes to one of the plug sockets 150, through a plug connection to socket 151, through emitter EM1, out via the 11th segment of this emitter, through the corresponding zone relay coil Z11 and back to line 192. Contacts Z11a close to maintain relay Z11 energized, via stick circuit established through cam contacts CF1. Near the end of this same card feed cycle, card lever contacts 42 (Fig. 19c) close to energize relay coil N. A holding circuit for N is established through stick contacts N1 and cam contacts CF5.

Summarizing the operations just described as to card handling on the first card feed cycle, a card is withdrawn from the supply magazine 31 (Fig. 13) and advanced to a point in which its leading edge is just under the presensing brushes B1. On the following machine cycle the card traverses the presensing brushes and it is during this cycle that the zone designations are sensed and the zoning relay coil or coils set up.

It may be here mentioned that with the present machine exposure of variable data from the character carrying drum is effected by firing the related neon tube or tubes at the proper differential times. Such neon tubes required considerable voltage to fire them. In order to provide such voltage, use is made of sets of condensers K, one set of condensers being provided for each column of data to be recorded. The condensers are charged from the relatively low voltage D. C. supply lines with the condensers of each set connected in parallel. When so connected the condensers will be charged to approximately the line potential of the low voltage D. C. supply lines. After the condensers are thus charged, and before recording, provision is made for reconnecting the condensers of each set in a series relation. With the condensers connected in this way a high potential is available for flashing or firing a related neon tube or tubes.

It will be further appreciated that if a neon tube will fail to fire for any recording operation, the result would be that there would be no exposure on the film for that particular columnar order. With such a tube failure, many lines of film might be run through the machine before the tube failure was detected. It would only be after the film had been removed and developed that such tube failure would be detected. To prevent such undesired operation testing and indicating means are provided. The general principle of operation of the testing and indicating means may be explained as follows. If a particular neon tube fails to fire, its related bank of firing condensers K will retain a charge after the tube has failed to fire. This retained charge may be utilized to energize testing relays. If such testing relays become energized an indicating lamp pertaining to that particular column is illuminated and furthermore, machine operation is automatically terminated. On the other hand if the sets of condensers after recording operation retain no charge, the testing relays will not be energized, the indicating lamp or lamps will not be illuminated and the machine operation will then be permitted to continue. Tests have demonstrated that relatively short and small neon tubes can be fired reliably with an applied voltage in the neighborhood of 1000 volts. Tests have also shown that with the direct current supply of 110 volts, the proper firing voltage can be obtained by using ten condensers each with a capacity of .25 microfarad and with such condensers connected in parallel for charging and in series for firing. Tests have also demonstrated that a character image can be sharply recorded on a panchromatic XX film with a lens system operating with an aperture of F4.5 and deriving light from a neon tube fired at approximately 1000 volts, and with the light of the tube passing through the moving character carrying drum under the following operating conditions. With a drum rotating at a speed of 150 revolutions per minute and with a 16 point cycle machine, four characters will pass the exposing point during each index point position. Under such recording conditions 64 character positions or spaces will pass the exposing position during one machine cycle. Accordingly, with 150 drum revolutions per minute, 9600 character positions will pass per minute or any one character position will pass the exposure position during $1/160$ of a second. Tests have also demonstrated that a neon tube can be fired using a commutator to establish the circuit to the tube and to accurately time the firing circuit with the commutator completing a circuit for a period of approximately $1/1200$ of a second. With such timing of tube firing, effective exposure was obtained and the film upon development disclosed clearly defined character images, notwithstanding drum movement during exposure.

Referring now to conditions in the third machine cycle, when the first record passes under the regular analyzing brushes B2, at the beginning of this cycle a bank of condensers K pertaining to a related card column (see Fig. 19a) is charged. The charging circuit is from line 191, relay contacts N3, impulse distributor CD1, resistance 212, in parallel through all of the R2 contacts, through the condensers K, through the S2 contacts, through the plug connection between sockets 164 and 165 and back to line 192.

It may be here mentioned that there is a CD1 timing commutator for each set of a plurality of sets of condensers and that all of these sets of condensers are concurrently charged. The charging circuit for one of the banks of condensers has been described and with such charging circuits established the related sets of condensers are charged to approximately 110 volts.

As soon as the various sets of condensers are charged provision is made for reconnecting the condensers of each set from their parallel relation to a series relation. Closure of cam contacts CF9 at the time shown in the timing diagram, establishes an energizing circuit through relay contacts N3 and cam contacts CF9 for relays R and S. With such relays energized, the contacts R2 and S2 open and the contacts R1 and S1 close. With such latter contacts closed, the various condensers of K of each set are connected in a series relation.

During the third machine cycle, i. e. the cycle in which the first card is traversing the brushes B2, recording control magnets E are energized and the auto-control circuits are set up. Assuming that the cards under the brushes B1 and B2 have agreeing group designating perforations, an auto-control circuit is established as follows: from line 191, through contacts M3, cam contacts CF16, contact roll 37, thence through a B1 brush and the plug connection from socket 150 to socket 154 of a relay U. The circuit is completed through the pickup coil of such relay U as follows: from socket 155, by way of a plug connection, not shown, to socket 152 through a brush B2 to the contact roll 38, thence via the cam contacts CF12, through relay contacts N4 to line 192. The auto-control relays which are of the usual dual winding type are picked up and close the stick contacts U1, to maintain the relays energized through a circuit extending from line 191, through cam contacts CF7. The energized U coils open the related U2 contacts so as to prevent energization of master auto-control relay P.

It may be pointed out that if the cards do not have corresponding agreeing group perforations that the U2 contacts will remain closed and upon closure of cam contacts CF14 near the end of the cycle, a circuit to coil P will be established via relay contacts N5, cam contacts CF14 and CF7. A holding circuit for relay coil P is provided through stick contacts P2 and cam contacts T13. Coil P will then open contacts P1 to break the card feed clutch magnet circuit (see Fig. 19c).

The relays E are energized under the control of the B2 brushes as they sense intra-zone or zero perforations in the columns where alphabetical recording is desired. It may be assumed that the card had an "11" zone indication in a particular column and let it also be assumed that it had an intra-zone value of "4" in the same column. At the "4" index point in which the card passes the brushes B2 a circuit will be completed from line 192, through relay contacts N4, cam contacts CF12, contact roll 38, through the hole in the card, through a B2 brush, through the plug connection from socket 152, to 158, relay coil E and back to line 191. Relay E is maintained energized under the control of stick contacts E1 and cam contacts CF2. Inasmuch as the record card had zone designation of "11," relay Z11 will have been energized in the manner previously explained. Closure of contacts E2 (Fig. 19b) completes a circuit during the time the distributor CD3 makes in the 4th cycle point as follows: from the right side of the lowest one of the charged set of condensers K, through this condenser to the line 213, thence through the associated now closed contacts S1, through the next condenser K and so on in series through the remaining condensers of the set and through the last one of the condensers through the upper R1 contacts and through plug socket 163. The circuit continues through a plug wire connected (not shown) to plug socket 160, through neon tube 58, through plug socket 161, and via plug connection to socket 162. From socket 162, the circuit is completed via line 214 (see also Fig. 19b), relay contacts E2 now closed, relay contacts Z11b now closed, to common "11" zone line 215, distributor CD3, line 216, through normally closed relay contacts V1, to a line 217 (see also Fig. 19a), via resistance 218, to the terminal of the lowest one of the contacts S1, and thence to the right hand side of lowest condensers K from which the circuit was started to be traced. This circuit is completed at the time the character M is in position to be recorded as will be clear from the timing diagram (Fig. 21). Note the "4" index point and the time of closure of the circuit controlled by distributor CD3. The full potential of the serially connected condensers will be available and applied to the neon tube. Such tube will then be fired and the condensers will be permitted to be discharged. As the neon tube is fired the recording drum will be trans-illuminated and the character M will be recorded on the film. Other characters or digits will be similarly recorded in other columns.

Zoning control

An explanation will be here given of the means whereby the zoning control is capable of selecting any one of four different characters pertaining to a zoning designation. Referring to Fig. 16, it may be explained that in the 9 intra-zone designation set there are four characters reading upwardly I, R, Z and 9. Such characters pass the exposure position in the order named. In accordance with the zone designation or lack of a zone designation in the card column accompanying a 9 intra-zone designation in the same column, one of these four characters will be selected for exposure. The zoning selection is effected through the use of the four distributors CD2, CD3, CD4 and CD5 shown in Fig. 19b. Distributor CD2 has its successive contact segments spaced apart the equivalent of one index point of a cycle, but the first contact segment is engaged by the distributor brush at the beginning of the 9 cycle point. The second segment is engaged one cycle point later at the beginning of the 8 index point and so on (see Fig. 21). Distributor CD3 has its contact segments spaced likewise the equivalent of cycle points apart, but the first contact segment of this distributor CD3 reaches its distributor brush a quarter of a cycle point later than the first contact segment of the distributor CD2 reaches its brush. Thus as indicated in Fig. 21, distributor CD3 has its effective circuit closing intervals timed to make one-quarter of a cycle point later than the effective circuit closing intervals of distributor CD2. Similarly the segments of distributor CD4 engage its distributor brush one-quarter of a cycle point later than the segments of CD3 engage their brush. Furthermore, the segments of distributor CD5 engage their distributor brush one-quarter of a cycle point later than the segments of CD4 engage their coacting brush.

Reference to Fig. 21 shows that during the 9 cycle point distributors CD2, CD3, CD4 and CD5 successively engage their first segments with their respective brushes at one-quarter cycle point intervals apart. The second set of segments bear the same relation during the 8 cycle point and so on for all the other cycle points.

If the zoning designation in a column was 0, then zoning relay coil Z0 will be energized (see Fig. 19a) and its contacts Z0b will close (Fig. 19b). Referring to Fig. 19b, the contacts Z0b connect to a common line 219 which is in circuit with the brush of the distributor CD4 so as to select this distributor for controlling the closure of a tube firing circuit. If the intra-zone designation be 9, this exposure or tube firing circuit will be made through the distributor CD4 at the point marked Z (Fig. 21) during the 9th cycle point. At this time the character Z on the drum is passing the exposure position and this character will be photographed as the exposure or tube firing circuit is closed. If the zone designation be 11, contacts Z11b will be closed (Fig. 19b) and the distributor CD3 would be selected for controlling the establishment of the tube firing circuit. If the intra-zone designation was still 9, the distributor CD3 would engage its brush at the point marked R (Fig. 21). At this point the character R will be passing the exposure position and the closure of the tube firing circuit will occur when the 9 intra-zone position is sensed to thereby photograph R on the film. If the zone designation was 12, zoning relay contacts Z12b would be closed, selecting distributor CD2 so that upon the sensing of a 9 intra-zone position the exposure or tube firing circuit would be closed at the beginning of the 9 cycle point at which time character I is passing the exposure position and such character accordingly would be photographed upon the film. If a particular column does not contain any zoning designation at all, contacts Z0c, Z11c and Z12c (Fig. 19b) will all be closed and the distributor CD5 will be selected for controlling and closing the exposure circuit. The sensing of a 9 index designation in such a card column would serve through distributor CD5 to close an exposure circuit near the end of the 9 cycle point at which point character 9 will be passing through the exposure position and such character 9 would be photographed on the film.

Referring to Fig. 16, it will be seen that each set of characters on the drum includes two zeros. The lowermost zero on the drum will be recorded in cases where a column of the leading card has a zero designation unaccompanied by a designation 9 to 1 and when the corresponding column of the card which immediately follows in the run also has its 0 index position perforated. The upper zero on the drum will be recorded when a column of the card in a run has a zero designation alone and when the following card in the same columns is not perforated in the 0 position. So far as photographing on the film is concerned, only one zero from the drum will be recorded in either event. When the lower zero of Fig. 16 is to be recorded, the control circuits are established as follows: The relay Z0 is energized when the zero on the card is sensed by brush B1. Zoning relays, however, are de-energized before the 0 cycle point of the next cycle in which the same card is traversing brushes B2. While this card is passing brushes B2, the next card is passing brushes B1 and if it has a zero perforation, the Z0 zoning relay will be picked up again. At the same time, the zero in the leading card is sensed and the exposure circuit is routed through the E2 contacts, the Z0b contacts and the CD4 distributor to expose the lowermost zero in the corresponding drum column. The upper zero shown in Fig. 16 will be exposed under the following conditions. Since the card under brushes B1 does not have a zero perforation, the Z0 relay will not be picked up as the 0 digit hole of the leading card is sensed by the brush B2. Accordingly, the exposure circuit will be routed through relay contacts E2, the normally closed contacts Z0c, Z11c, Z12c and the commutator CD5. The timing of the exposure circuit in that case is such as to expose the upper 0 in the corresponding drum column.

It may be explained that one purpose of the distributor CD2, CD3, etc. is to provide for a relatively short time interval during which a firing circuit is established to the tube. In practice, the firing circuit is established for a less interval of time than is indicated on the timing diagram (Fig. 21). The somewhat more extended circuit interval is shown in the timing diagram for clarity of illustration of the timing diagram itself. In practice, the circuit is closed for a somewhat shorter interval as has been pointed out heretofore. As stated before, in practice, sharply defined character images have been photographed and the condensers have been fairly completely discharged in the circuit closing interval of 1/1200 of a second.

Entry circuits to the accumulator are also established during the third card cycle when the card is passing the brushes B2. These entry circuits are traced as follows: from line 192 (Fig. 19a), relay contacts N4, cam contacts CF12, contact roll 38, through the hole in the card, through brush B2, to one of the plug sockets 152, through a plug connection to one of the sockets 153, through accumulator magnet 142, through cam contacts CF13 and back to line.

During each cycle in which variable data recording is effected additional increments of the separation lines are recorded. Such recording occurs first during the passage of a first card under the brushes B2 and thereafter occurs repeatedly as each successive card traverses the same brushes. The circuit controlling recording of the short lines during each passage of a card past the brushes B2 is as follows (see Fig. 19b): from line 192, through shutter trip magnet 112, through cam contacts CF10, through relay contacts N6 now closed, to the other side of the line 191. Energization of shutter trip magnet 112 records an increment of the separating lines to be exposed upon the film. When 112 is energized contacts 112a (Fig. 19b) close and film feed solenoid 88 is energized. Upon the de-energization of 112, 112a open to de-energize 88, thereby feeding the film one line space.

The film just prior to the last film feed step will present the general appearance shown in Fig. 25. In a similar manner variable data from the following cards are recorded on the film. At each recording operation there is also a recording of an extension of the separating lines on the film. At each recording cycle there is the attendant film feed.

It will be understood that the separation lines will be extended increment by increment in accordance with the successive recording of lines of variable data.

As stated before, provision should be made in the machine of this class to test and ascertain whether a tube has fired or failed to fire. A test circuit is established to determine if the neon tube has actually fired. The manner in which this testing is effected will be first outlined in general and thereafter the circuit will be described in further detail.

If a neon tube due to some defect fails to fire, the set of condensers K will not discharge. After the neon tube firing circuit is completed, the connections to the set of condensers are shifted back to a parallel relation and the terminals of such parallel connected condensers applied to a relay. If there is a charge left in the bank of condensers this will signify that the related neon tube has failed to fire and this retained charge will be utilized to energize a test relay coil. Contacts controlled by this relay may be utilized to stop the machine or to illuminate an indicating lamp or both. The lamp or lamps which are illuminated will denote the particular column of condensers which have retained a charge and these columns of condensers will be related to corresponding neon tubes so that the defective tubes can be located.

After relay coils R and S are de-energized by the opening of cam contacts CF9, a test circuit is established which may be traced as follows: from the left side of the condensers K (Fig. 19a), through relay contacts R2, card lever relay contacts N7, cam contacts CF8 now closed, intra-zone relay contacts E3, now shifted, relay coil L, resistance 222 and back to condensers K, through contacts S2. If relay L is energized, it is maintained energized by a circuit through stick contacts L2, through a lamp 223, through key controlled contacts 224, to line 191. The other side of relay L is connected back to line through a resistance 222, and the connected plug sockets 164 and 165. If a relay L is energized relay contacts L1 (see Fig. 19c) will open and break the holding circuit to card feed relay Q, thus stopping the machine. Lamp 223 remains illuminated as long as the above mentioned stick circuit is maintained closed. The particular lamp which is illuminated indicates the bank of condensers which has retained a charge and thereby indicates the particular neon tube which has failed to fire. Lamps 222 are shown in Fig. 1 and numbered to correspond with the related condenser banks. By checking up the plugging of the condensers to the neon tubes, the operator of the machine can ascertain which neon tube has failed to fire.

After the operator has noted which of the neon tubes is defective and has taken this tube out in order to replace it, the stick circuit of coil L and the circuit of lamp 223 may be broken by manually depressing the key to open contacts 224.

If any one of the L relays is energized, one of the contacts L1 (see Fig. 19c) will open and break the holding circuit to the card feed relay Q and also break the circuit to the card feed clutch magnet 28. With these circuits broken, machine operations will terminate. If a neon tube has correctly fired, its related test relay will not be energized and the machine will continue to run until there is either a change in control or until the machine runs out of film or cards or until the stop key is depressed. If any particular column on the card is blank, as for example, to provide for spaces between different names and initials, etc., the relay E for the related column will not be energized and the circuit from the condensers will extend through the normally closed side of relay contacts E3 and the condensers will be discharged through the resistance 222.

It has been previously explained that if the cards do not have an agreeing group designating perforation, relay P (Fig. 19a) will be energized. Relay P when energized will open its contacts P1 (Fig. 19c) and de-energize the card feed relay Q and the card feed clutch magnet 28 and thus stop record feeding operations.

Termination of machine operations may also be effected by depression of the stop key. Depression of the stop key opens contacts 210 to interrupt the circuit to relay coil Q and to clutch magnet 28. Machine operation will also be terminated in the event that film contacts 109 open upon the machine running out of film. After machine operation is stopped, as for example under group control, a total cycle may be manually or automatically initiated depending on the setting of switch 250 (see Fig. 19c). Assuming hand switch 250 is in open position, the machine is set for manual initiation of a total cycle. After card feed has been interrupted, and it is desired to record a total, the operator may depress a so-called total key, closing contacts 225 (Fig. 19c). Closure of these contacts completes a circuit from line 192, then in parallel through total clutch magnet TM and relay coil V, through total key contacts 225, cam contacts CF4, relay contacts W2, now in the position shown, relay contacts Q2 now closed, then in series through the serially connected test contacts L1 to line 191. It will be understood that the above total circuit will not be completed if any of the neon tubes are defective and fail to fire. Energization of the relay coil V closes stick contacts V2, to maintain magnet TM energized and coil V energized through a stick circuit extending to line through the total cam contacts T1. Energization of the total clutch magnet TM (Fig. 1a) rotates the various T cam contacts and causes rotation of distributors TD1 and TD2 and emitter EM4. The condensers K are charged in the manner previously explained, except that the circuit from line 191 extends through the distributor TD1 instead of through relay contacts N3 and distributor CD1. Relay coils R and S are now energized to effect the connecting of the condensers in series. The energizing circuit is from line 191, through cam contacts T11, relay coils R and S and back to line 192, through the plug connection between 164 and 165. Emitter EM4 and distributor TD2 are now rotating and a total readout circuit is established which may be traced as follows: from a plug socket 162 (Fig. 19a), wire 214 (see also 16b), plug socket 187, via plug wire connection to plug socket 166, to the common strip of the accumulator readout 141, through the brushes of the readout and the segment engaged thereby, through the emitter EM4 and distributor TD2 and via the now shifted V1 contacts to line 217 (see also Fig. 19a). The line 217 extends through a resistance 218, the contacts S1 and condensers K in series and finally through the upper and last condensers K to the contacts R1 now closed, through the plug connections to sockets 160, through the neon tube 158 and from socket 161, via plug connection to socket 162, at which point tracing was started.

The neon tube flashing at the proper time will cause recording of the digit which corresponds to the brush setting on the readout. When totals are to be recorded, it is desirable to record a total symbol adjacent the total data on the film. This may be conveniently effected by recording the symbol T. Recording of such symbol may be effected from the set of condensers K which are shown to the extreme right in Fig. 19a. Associated with this bank of condensers is a pair of contacts T4 which close during total taking operations. With such contacts closed, the discharge circuit in this particular bank of condensers is established to the related neon tube 58 at the time the T character on the drum is passing the exposing position. This will record the character T on the drum. Tube testing is effected during total recording. There is a special test circuit similar to the one previously traced except that it extends through total cam contacts T10 which shunt relay contacts N7 and cam contacts CF8 and the shifted side of the intra-zone relay contacts E3. To prevent more than one total cycle occurring due to a second or continued depression of the total key, a so-called interlock relay W (Fig. 19c) is energized. The circuit for this interlock relay is from line 191, through cam contacts T2, interlock relay coil W and back to line 192. A holding circuit for W is established through contacts W1, cam contacts CF6 and key controlled contacts 224a, and back to line 191. It should be noted that the contacts 224 of the testing circuit (see Fig. 19a) and the contacts 224a just mentioned are controlled by the same key. Hence if any of the tubes are found defective during a total cycle showing that a total has not been properly recorded, the operator after replacing the defective tube with a good tube may depress the key to open both contacts 224 and 224a. The opening of contacts 224 (Fig. 19a) breaks the stick circuit of the testing coil L in the lamp 223. The opening of contacts 224a (Fig. 19c) breaks the stick circuit of coil W. Accordingly, contacts W2 in the total circuit which includes the total clutch magnet TM are closed and a new total cycle may be initiated by the depression of the total key. The total may then be properly recorded with all the tubes in operating condition.

It may be mentioned that during the recording of the total data on the film there is no recording of any increments of separating lines. This is due to the fact that the recording of the separating lines was effected under control of cam contacts CF10 (see Figs. 19b and 21). Such contacts do not close on a total cycle. Provision is made, however, for effecting a recording of separating line increments concurrently with recording of the footing. This recording of the footing is effected after the mask has shifted to third position.

To provide for the shifting of the mask to third position, i. e. the position shown in Fig. 27, after recording of a total cam contacts T5 close at the time shown in the timing diagram, Fig. 21.

Referring to Fig. 19c, closure of cam contacts T5 establishes a circuit to energize mask control magnet 314, (see also Fig. 6). With such magnet 314 energized, the armature 313 is withdrawn from engagement with pin 309 of the mask causing the mask to drop to its third position. This position is determined by engagement of the roller 315 carried by the mask frame 301 with the cam 316. The mask is now in the position shown in Fig. 27 in which it conceals the heading and reveals the footing and the short lines LL. Should exposure occur with the mask in third position, the image of the footing, due to reversal by lens system 75, will be directly above the image of the short lines.

It will be understood from the previous description (Figs. 22 to 26) that the separation lines always extend 11 lines above the variable data recording position and the last variable data line record. When a total is recorded there is as yet no accompanying line spacing of the film or recording of an additional increment of the separation lines. Accordingly, the separation lines after recording of the total extend 10 lines above the total record on the film.

The upper ends of these separation lines are at this point (see Fig. 27) at the bottom of the image field of the short lines and the recording of the short lines which will take place subsequently will provide continuation of the separation lines. Directly above the last increment of the separation lines to be recorded, the film will receive a recording of the footing. Now with the mask in the third position and the film in the position shown in Fig. 27, the machine is ready to record the last increment of the separation lines and also the footing to complete the form as indicated in Fig. 27. This is done under control of cam contacts T6 (see the timing chart, Fig. 21).

Referring to Fig. 19b, closure of cam contacts T6 establishes a circuit from line 192, through shutter magnet 112, cam contacts T6 and to opposite line 191. Energization of magnet 112 exposes the now unmasked footing and short lines to cause the recording of their counterparts on the film. In the manner previously described, energization of magnet 112 also closes contacts 112a to energize film feed control solenoid 88 and when cam contacts P6 open to de-energize magnet 112, contacts 112a open de-energizing solenoid 88 and causing film feed.

During the second half of the total and reset cycle the accumulators are reset. The accumulator reset initiating circuit is from line 191 (Fig. 19c), series relay contacts L1, cam contacts T9, switch 226, reset magnet 143, to line 192. Energization of magnet 143 (see Fig. 1) clutches the accumulator mechanism to the reset shaft. If manual control of reset is desired, switch 226 is shifted to open position, thereafter upon depression of the manual reset key 227 its contacts will close and establish a circuit to energize the reset magnet 143.

Provision is made for restoring the mask from its final third position back to first position. When cam contacts T3 close at the time shown in the timing diagram, clutch magnet 327 (Fig. 4a) is energized. Thereupon the shaft 317 turns through a complete revolution. The cam 316 engages the roller 315 in the mask frame and the frame and its mask is elevated up to first position. It is retained in this position by the armature 310 engaging the pin 308 (see Fig. 6).

After the completion of the total cycle, during which cycle the mask is restored, a new series of recording and card handling operations pertaining to the next card group may be initiated. Such initiation may be effected manually provided hand switch 251 (Fig. 19b) is open. In such case the operator will depress the key 194 and the machine operations will then follow in the manner previously described. The first operation will be the recording of a new heading (see Fig. 28).

If total taking is to be automatically initiated, switch 250 (Fig. 19c) is thrown to closed position before the beginning of a run. Then upon group change and interruption of card feed, relay P is energized and contacts P3 will be closed. With contacts P3 (Fig. 19c) closed, upon closure of cam contacts CF17 relay coil V and total clutch magnet TM will be automatically energized. Totaling operation will then ensue in the manner previously described.

If recording and card feed operations are to be automatically resumed after the total cycle, the operator before starting up a run, shifts switch 251 (Fig. 19b) to closed position. With cards present in the position to be sensed the card lever relay N will be energized and relay contacts N9 (Fig. 19b) will be closed. Accordingly, upon closure of cam contacts T14 at the time shown in the timing diagram, Fig. 21, the shutter trip magnet 112 will be energized and the stepping switch magnet 195 will be automatically energized. Machine operations then ensue in the same way as described before when 112 and 195 were energized by closing key contacts 194.

It may be mentioned that cam contacts T14 close after the mask has been fully restored to 1st position.

What is claimed is:

1. A recording apparatus for a record controlled accounting machine for recording variable data represented on records upon a film and for recording a complete form which bounds the variable data, including in combination record controlled means for photographing variable data line by line upon a film with at least one line recorded for each record, means to photographically record form data on said film, and record controlled means to variably determine the length of the form which is photographed on the film.

2. A photographic recording apparatus to record variable data and a confining form for the variable data upon a film, comprising in combination, form source means, means for exposing variable lengths of forms derived from the source means upon the film, means to expose a variable number of lines of variable data upon the film within an area thereof confined by the form record on the film, and means dependent on the number of exposures of lines of variable data for determining the length of the form exposed upon the film.

3. A photographic recording apparatus to record variable data within the confines of a form, comprising in combination, form source means, means coacting therewith for photographically exposing and recording variable lengths of forms upon a suitable medium, codal character designation-controlled means to select variable data, means controlled thereby to photographically record a variable number of lines of selected variable data upon the medium in an area thereof to be confined by the form record, and means dependent on the number of lines of variable data recordings for controlling the form recording means to determine the length of form recorded upon the medium and within which the variable data lines are confined.

4. A photographic recording apparatus for recording variable character data on a suitable medium between heading and terminal sections of a single form, comprising in combination, prerepresented patterns of the heading and terminal sections, means coacting with the heading section pattern and terminal section pattern in succession for causing their photographic exposure and recording in spaced areas of said medium, codal character designation-responsive circuits, means controlled by said circuits to photographically record a variable number of variable data lines, composed of selected character data, on the medium intermediate said areas, and means dependent on the number of variable data lines recorded on the medium for selectively automatically determining the spacing between said areas.

5. A photographic recording apparatus to record variable character data between heading and terminal sections of the same form, comprising in combination, means to photographically expose the heading section to a light sensitive medium, means to select variable data, means controlled thereby to photographically record lines of selected variable data in succession upon the medium to follow the heading section thereon, and means effective automatically after completion of the variable data recording operations to cause the terminal section to be photographically exposed and recorded on the medium to follow the lines of variable data thereon.

6. A photographic recording apparatus to record variable character data and kindred form matter upon a suitable medium, comprising in combination, source means for form matter, means coacting with the source means for photographically recording form matter in spaced areas of the said medium, record-controlled means for photographically recording a variable number of lines of variable data on the medium intermediate the spaced areas thereof which receive the form matter, and means dependent on the number of lines of variable data recorded on the medium for automatically determining the spacing between the said areas.

7. A recording apparatus for making a record which comprises a complete form with lines of character data bounded by and in determined arrangement on said form, including in combination means controlled by character designations on record material to selectively photographically record designated character data line by line on a film, means to expose form matter upon the film, and means to vary the length of the complete form composed of said form matter which is exposed by the last mentioned means.

8. A recording apparatus for making a record which comprises a complete form with lines of variable data bounded by and in determined arrangement on said form, including in combination means to selectively expose such variable data line by line on a film, means to expose form matter upon the film, and means to vary the length of the complete form composed of said form matter which is exposed by the last mentioned means, wherein the means to vary the length of a complete form comprises means to effect multiple exposures of form matter, including one exposure for a heading portion of the form and another exposure for a footing of the form and means to vary the spacing on the film between the heading exposure and the footing exposure.

9. A recording apparatus to effect facsimile recording transference of character data and kindred form matter to a suitable medium, comprising in combination, means bearing pre-represented character data, means to select character data, means controlled thereby for effecting facsimile image recording transference of selected character data from the character data bearing means to the medium, means to feed the medium to receive such selected character data recordings in successive lines, a plurality of form matter patterns comprising components of a single form and means to cause successive image recording transference of form matter from the patterns to the medium in locations thereof contiguous to and correlated with the locations for receiving the lines of character data, whereby the variable data lines are recorded in relation to a single form.

10. A photographic recording apparatus to photograph character data and kindred form matter upon a film, comprising in combination, means bearing pre-represented character data, means to select character data, means controlled thereby to expose selected character data upon the data bearing means to the film, film feeding mechanism, means to control the feeding mechanism to present successive lines of the film to character data exposing position, a plurality of form matter patterns comprising components of a single form, means to cause exposure of the patterns in succession to the film to photograph thereon in succession form matter derived from the patterns, and means to control the feeding mechanism to present successive film portions, contiguous to and correlated with the portions for receiving the lines of character data, to the form patterns during their successive exposure.

11. A photographic recording apparatus to photograph character data and kindred form matter upon a film, comprising in combination, means bearing pre-represented character data, means to select character data, means controlled thereby to photograph selected character data derived from the character data bearing means upon the film, means to feed the film line by line to receive selected character data upon successive lines, a plurality of form matter patterns comprising components of a single form, and means to cause photo-transference in succession of form matter from said patterns to the film in locations thereof contiguous to and correlated with the locations for receiving the lines of character data.

12. A photographic recording apparatus to effect photo-transference of character data and kindred form matter to a light sensitive medium, comprising in combination, means bearing pre-represented character data, means to effect photo-transference in succession of lines of character data from the character data bearing means to the light sensitive medium, a plurality of patterns of form matter comprising components of a single form, and means to cause photo-transference of the form matter from first one said pattern and then from another said pattern to the light sensitive medium in positions thereof contiguous to and correlated with the positions for receiving the lines of character data.

13. A photographic recording apparatus to effect photo-transference of variable data and kindred form matter to a light sensitive medium, comprising in combination, means bearing data patterns, means to select variable data, means controlled thereby to cause photo-transference of selected variable data from the data patterns on said bearing means to the medium, a plurality of form matter patterns comprising components of a single form, and means to cause photo-transference in succession of form matter from the form matter patterns to the medium in positions thereof contiguous to and correlated with the positions for receiving the selected variable data.

14. A recording apparatus including in combination, source means for form data from which different component sections of a complete form may be derived by successive photographic exposures, means to select variable data, means controlled thereby to expose the selected variable data to a film, photographing means including means to cause successive exposures of said component sections of form data derived from the source means to the film whereby the complete form is exposed upon the film in a position correlated with the variable data.

15. A photographic recording apparatus comprising means for photographing a form heading upon a film, means for photographing lines of variable data upon the film to follow the form heading, total taking means, means controlled thereby for photographing a total pertaining to the lines of variable data upon the film, and means effective for operation under control of the total taking means following photographic recording of the total for photographing a footing for the form upon the film to follow the total record thereon, whereby the variable data and total are recorded on the film within the limits of the form.

16. A photographic recording apparatus comprising a plurality of patterns of components of a single form, a camera unit carrying film upon which the patterns are to be exposed, exposure means for exposing the patterns selectively to the film, means for selecting first one pattern and then another for exposure, whereby the components of the form are successively exposed upon the film, means for selecting variable data, and means controlled thereby to expose the selected variable data to the film within the limits of the form.

17. A photographic recording apparatus comprising a carrying means for patterns of components of a single form, masking means having different positions for selectively masking and revealing said patterns, means for automatically positioning said masking means to successively reveal one pattern after another, means for photographically recording the revealed patterns one after another upon a film to provide a photograph thereon of a complete form, means carrying pre-represented character data, means to select character data, and means controlled thereby to expose such of the pre-represented data as constitute the selected character data and to photographically record the selected character data in an area of the film defined by the form photographically recorded on the film.

18. A photographic recording apparatus comprising source means for pre-represented line increments, means to expose the pre-represented line increments to a film, means for photographically recording lines of data in succession upon the film, and electrical means operable once for each recording of the successive lines of data for repeatedly rendering the exposing means effective to expose the pre-represented line increments, whereby elongated lines comprised of successively photographed line increments are recorded upon the film, with the length of such elongated lines being dependent on the number of lines of data recorded on the film.

19. A photographic recording apparatus for recording variable data within the limits of a form, comprising in combination, source means for patterns of heading, footing, and intermediate defining line increments of a single form, means for exposing the heading pattern to a film to provide a photograph of the form heading upon the film, means for thereafter repeatedly exposing the pattern of line increments to the film to provide by such repeated exposure continuous lines upon the film following the heading photographed thereon, with such continuous lines comprising successively recorded line increments, means for variably determining the number of repeated exposures of the line increments so as to determine the length of the continuous lines, and means for exposing the footing pattern to the film to provide a photograph of the footing thereon following the continuous lines thereon, whereby, by such successive exposures of the patterns of the heading, line increments, and footing, a complete form of variable length is photographically recorded upon the film.

20. A machine to photographically record variable data and correlating form matter upon a film, comprising source means for the form matter, source means for the variable data, means to photographically expose form matter from the source means therefor upon the film, means to select the variable data, means controlled thereby to photographically expose selected variable data from the source means therefor upon the film, means to effect operation of the form matter exposing means preceding the exposure of the variable data and a repeat operation of the form matter exposing means following the exposure of the variable data, whereby said successive exposures of form matter are spaced apart by the exposed variable data, and means to feed the film to receive the first exposure of the form matter, then a variable number of successive lines of exposure of selected variable data, and then the second exposure of form matter, whereby the spacing between the form matter exposures varies according to the variable number of lines of variable data exposed upon the film.

JAMES W. BRYCE.